(12) United States Patent
Zhang et al.

(10) Patent No.: US 8,804,609 B2
(45) Date of Patent: Aug. 12, 2014

(54) SYSTEMS AND METHODS FOR USE WITH ORTHOGONAL FREQUENCY DIVISION MULTIPLEXING

(75) Inventors: Hang Zhang, Nepean (CA); Mo-Han Fong, L'Orignal (CA); Peiying Zhu, Kanata (CA); Wen Tong, Ottawa (CA)

(73) Assignee: Apple Inc., Cupertino, CA (US)

( * ) Notice: Subject to any disclaimer, the term of this patent is extended or adjusted under 35 U.S.C. 154(b) by 1546 days.

(21) Appl. No.: 11/666,882

(22) PCT Filed: Oct. 13, 2005

(86) PCT No.: PCT/CA2005/001561
§ 371 (c)(1),
(2), (4) Date: Nov. 27, 2007

(87) PCT Pub. No.: WO2006/047851
PCT Pub. Date: May 11, 2006

(65) Prior Publication Data
US 2008/0187136 A1 Aug. 7, 2008

Related U.S. Application Data

(60) Provisional application No. 60/624,343, filed on Nov. 2, 2004.

(51) Int. Cl.
*H04W 4/00* (2009.01)
(52) U.S. Cl.
USPC .......................................... 370/328; 370/401
(58) Field of Classification Search
USPC ................................. 370/328, 329, 338, 401
See application file for complete search history.

(56) References Cited

U.S. PATENT DOCUMENTS 6,256,334 B1 * 7/2001 Adachi ........................ 375/132
6,937,592 B1 * 8/2005 Heath et al. ................... 370/342
(Continued)

FOREIGN PATENT DOCUMENTS

WO    WO 03069818    8/2003

OTHER PUBLICATIONS

Zhang, Jinwen; Yan Linlin; Wang Wenbao; Liu Yan'an; "Parallel hybrid ARQ for OFDM based broadband wireless packet access" Communications, Circuits and Systems, 2004. ICCCAS 2004. 2004 International Conference on vol. 1, Jun. 27-29, 2004, pp. 452-456 vol. 1.

(Continued)

*Primary Examiner* — Ricky Ngo
*Assistant Examiner* — Christine Ng
(74) *Attorney, Agent, or Firm* — Fay Kaplun & Marcin, LLP

(57) ABSTRACT

Systems and methods are provided for enabling H-ARQ communication between a base station and one or more wireless terminals. Methods for enabling incremental redundancy (IR) based H-ARQ, Chase based H-ARQ and Space-Time Code combining (STC) based H-ARQ between devices for down-link and up-link direction transmissions are provided in the form of an information element (IE) for use with a Normal MAP convention as currently accepted in the draft version standard of IEEE 802.16. In addition, embodiments of the invention provide a resource management scheme to protect a network from abuse of resources from a wireless terminal not registered with the network. Components of the down-link and up-link mapping components of a data frame transmitted from the base station to one or more wireless terminals included messages that are readable by all wireless terminals as well as some messages that are encrypted and only readable by wireless terminals that are authenticated as being registered with the network.

22 Claims, 17 Drawing Sheets

(56) References Cited

U.S. PATENT DOCUMENTS

| | | | |
|---|---|---|---|
| 6,987,780 B2* | 1/2006 | Wei et al. | 370/469 |
| 7,190,685 B2* | 3/2007 | Das et al. | 370/336 |
| 7,346,037 B2* | 3/2008 | Yun et al. | 370/335 |
| 7,379,416 B2* | 5/2008 | Yang et al. | 370/208 |
| 7,409,630 B1* | 8/2008 | Wu et al. | 714/790 |
| 7,483,675 B2* | 1/2009 | Kent et al. | 455/67.11 |
| 7,590,094 B2* | 9/2009 | Qian et al. | 370/332 |
| 7,594,153 B2* | 9/2009 | Kim et al. | 714/751 |
| 7,773,535 B2* | 8/2010 | Vook et al. | 455/452.2 |
| 2003/0096613 A1* | 5/2003 | Das et al. | 455/450 |
| 2005/0143085 A1* | 6/2005 | Bi et al. | 455/452.2 |
| 2008/0075033 A1* | 3/2008 | Shattil | 370/328 |

OTHER PUBLICATIONS

International Search Report dated Jan. 30, 2006 from International Patent Application No. PCT/CA2005/001561.

Nortel Networks: "Mapping of Rel 5 HS-DSCH signalling information onto the OFDM HS-DSCH associated signalling, and related Text proposal for TR 25.892" 3GPP Draft; R1-030782, 3rd Generation Partnership Project (3GPP), Mobile Competence Centre; 650, Route Des Lucioles; F-06921 Sophia-Antipolis Cedex; France, vol. RAN WG1, no. New York, USA; Aug. 21, 2003, XP050097890.

3GPP: "3GPP TR 25.892 V6.0.0: Feasibility Study for Orthogonal Frequency Division Multiplexing (OFDM) for UTRAN enhancement (Release 6)" Jun. 1, 2004, XP002595526 Retrieved from the Internet: URL:http://ftp.3gpp.org/Specs/html-info/25892.htm.

Lucent Technologies Inc: "Needed Functionality to utilise MIMO Technology in HSDPA" 3GPP Draft; 12A010022, 3rd Generation Partnership Project (3GPP), Mobile Competence Centre; 650, Route Des Lucioles; F-06921 Sophia-Antipolis Cedex; France, vol. RAN WG2, no. Sophia Antipolis, France, Apr. 3, 2001, XP050141290.

* cited by examiner

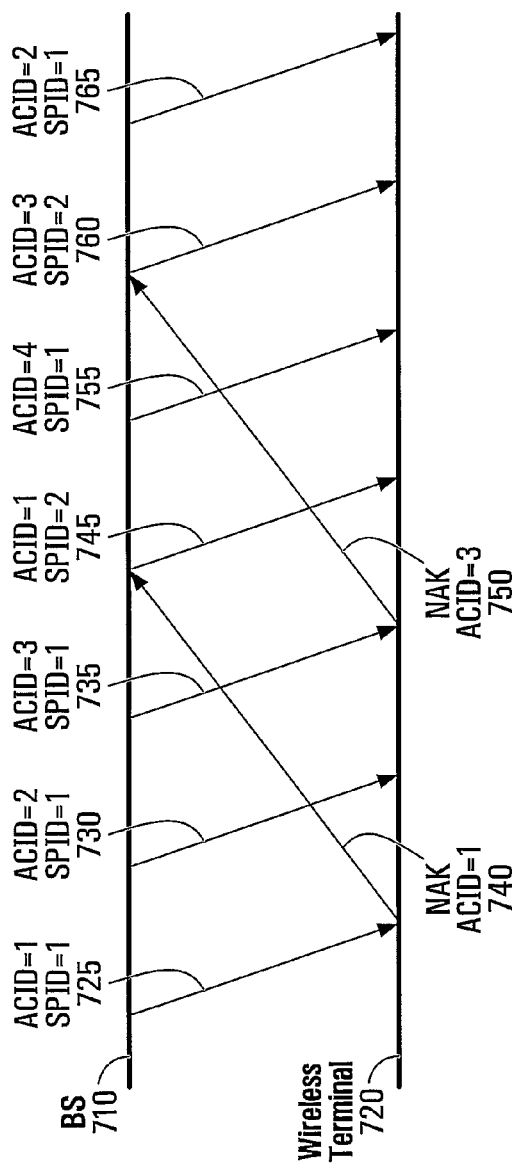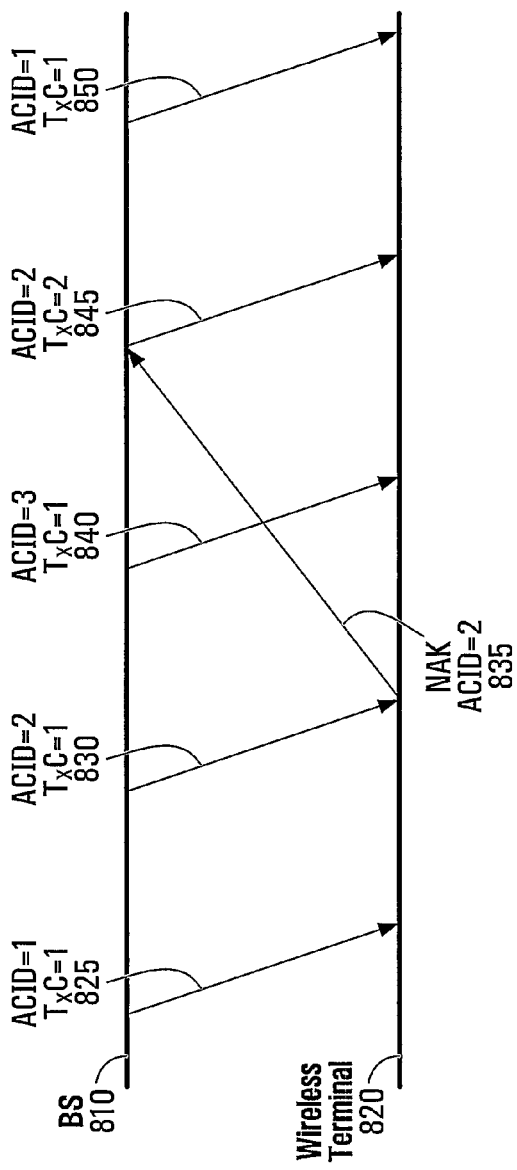

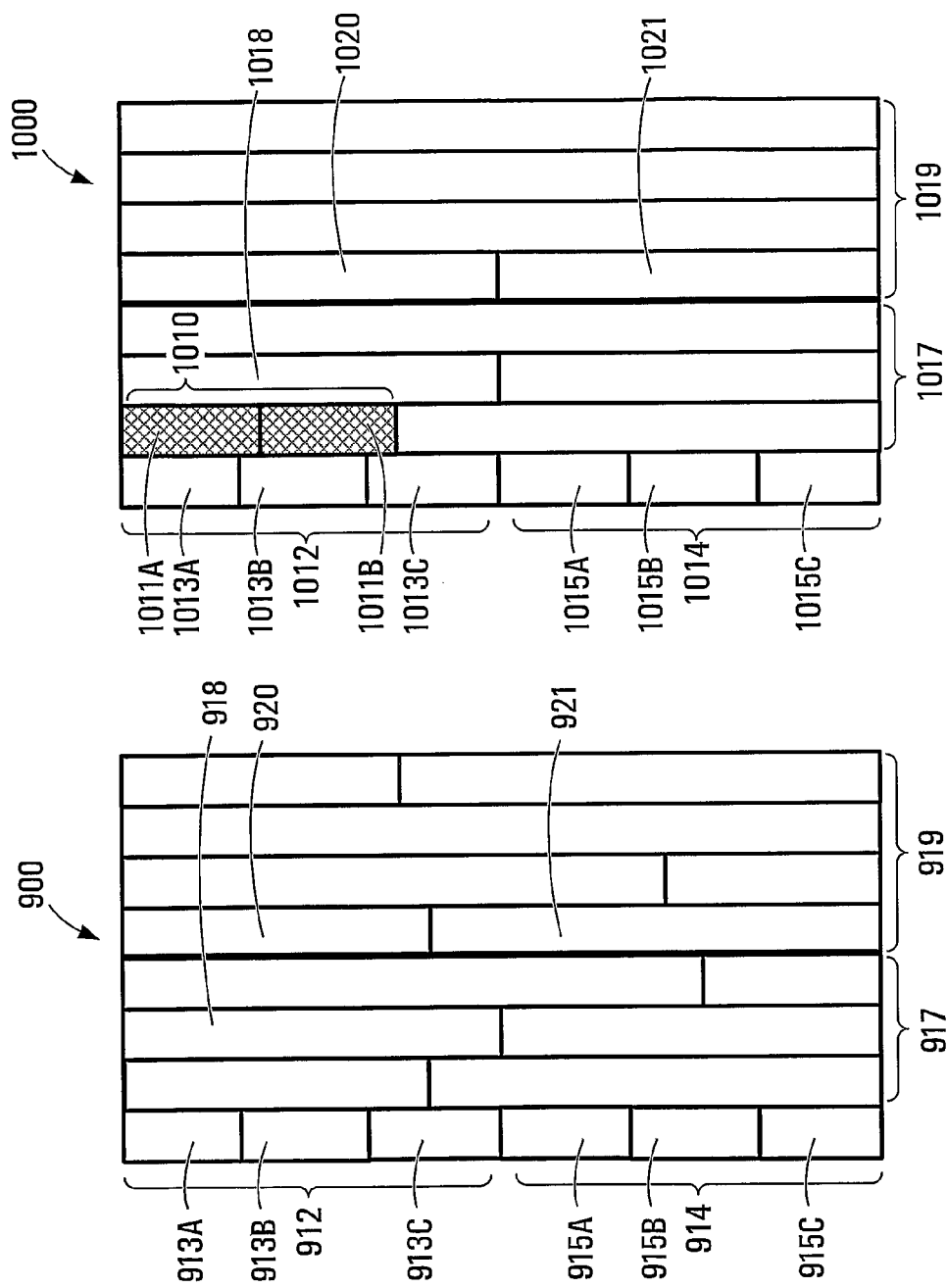

US 8,804,609 B2

SYSTEMS AND METHODS FOR USE WITH ORTHOGONAL FREQUENCY DIVISION MULTIPLEXING

RELATED APPLICATIONS

This application claims the benefit of and is a National Phase Entry of International Application PCT/CA2005/001561 filed Oct. 13, 2005. which is incorporated herein by reference and which claims the benefit of U.S. Provisional Patent Application No. 60/624,343 filed on Nov. 2, 2004, which is hereby incorporated in its entirety.

FIELD OF THE INVENTION

The invention generally relates to the field of wireless communications, more specifically to systems and methods for broadband mobile wireless metropolitan networks including networks operating according to the IEEE 802.16(e) standard.

BACKGROUND OF THE INVENTION

Orthogonal frequency division multiplexing (OFDM) is a form of multiplexing that distributes data over a number of carriers that have a very precise spacing in the frequency domain. The precise spacing of the carriers provides several benefits such as high spectral efficiency, resiliency to radio frequency interference and lower multi-path distortion. Due to its beneficial properties and superior performance in multi-path fading wireless channels, OFDM has been identified as a useful technique in the area of high data-rate wireless communication, for example wireless metropolitan area networks (MAN). Wireless MAN are networks to be implemented over an air interface for fixed, portable, and mobile broadband access systems. A standard being developed for use with OFDM and wireless networks is IEEE 802.16.

In early versions of the standard for IEEE 802.16 there was no accepted manner for hybrid automatic repeat request (H-ARQ) operation. The accepted down-link (DL) and up-link (UL) allocation mapping (or MAP) information element (IE) structure had no IE formats that enabled H-ARQ communication between devices.

Also, in more recent versions of the IEEE 802.16 standard, a bandwidth (BW) request media access control (MAC) header is used for a registered wireless terminal to request UL bandwidth. However, there is no authentication field attached to this header. As no formal registration to a network is needed to request resources from the network, any malicious terminal can monitor a UL-MAP message sent by a base station and determine an OFDM region assigned for sending a BW request code (taking OFDMA PHY as an example) and then sending the BW request header using a CID (connection identification) assigned to a wireless terminal that is registered with the network. Such a malicious wireless terminal may significantly interfere with normal operation of a network operating in compliance with the IEEE 802.16 standard.

A need exists for improved systems and methods to overcome these problems.

SUMMARY OF THE INVENTION

According to a first aspect of the invention there is provided a method in a base station for operating a hybrid automatic repeat request (H-ARQ) enabled OFDM (orthogonal frequency multiplexing) connection with a wireless terminal, the method comprising: the base station sending the wireless terminal an indication of a total number of transmission resource allocations to be made in a data frame; for each transmission resource allocation, the base station: sending the wireless terminal location information of where a H-ARQ transmission is located in the data frame; sending an identification of a channel on which the H-ARQ transmission is being transmitted; sending an identification of the H-ARQ transmission.

In some embodiments, the H-ARQ enabled connection is an incremental redundancy (IR) based H-ARQ enabled connection.

In some embodiments, the method is for use with a MIMO enabled wireless terminal and for enabling the H-ARQ transmission in a down-link (DL) direction from the base station to the wireless terminal, the method further comprising for each transmission resource allocation, the base station: sending a total number of data streams to be used for transmitting to the wireless terminal; and sending the identification of the channel and sending the identification of the H-ARQ transmission for each resource allocation are performed for each data stream, wherein sending the identification of the H-ARQ transmission comprises sending an indication of when a new packet, which includes the H-ARQ transmission, is being transmitted and sending an identification of a sub-packet, which includes at least a portion of the H-ARQ transmission, that is being transmitted.

In some embodiments, the H-ARQ enabled connection is a Chase based H-ARQ enabled connection.

In some embodiments, the method is for use with a MIMO enabled wireless terminal and for enabling the H-ARQ transmission in a down-link (DL) direction from the base station to the wireless terminal, the method further comprising for each assignment, the base station: sending a total number of data streams to be used for transmitting to the wireless terminal; and sending the identification of the channel and sending the identification of the H-ARQ transmission for each resource allocation are performed for each data stream, wherein sending the identification of the H-ARQ transmission comprises sending an indication of a transmission count that indicates a number of times the H-ARQ transmission has been transmitted including the current transmission.

In some embodiments, the method is for use with a MIMO enabled wireless terminal and for enabling the H-ARQ transmission in an up-link (UL) direction from the wireless terminal to the base station, the method further comprising for each transmission resource allocation, the base station: sending an indication of whether the H-ARQ transmission from the wireless terminal to the base station is to be performed using collaborative spatial multiplexing or not; if the H-ARQ transmission from the wireless terminal to the base station is not performed using collaborative spatial multiplexing, the base station sending an indication of when a new packet, which includes the H-ARQ transmission, is being transmitted and sending an identification of a sub-packet, which includes at least a portion of the H-ARQ transmission, that is being transmitted; if the H-ARQ transmission from the wireless terminal to the base station is performed using collaborative spatial multiplexing, for each wireless terminal used in the collaborative spatial multiplexing, the base station sending an indication of when the new packet, which includes the H-ARQ transmission, is being transmitted and sending an identification of the sub-packet, which includes at least a portion of the H-ARQ transmission, that is being transmitted.

In some embodiments, the method is for use with a MIMO enabled wireless terminal and for enabling the H-ARQ transmission in an up-link (UL) direction from the wireless terminal to the base station, the method further comprising for each transmission resource allocation, the base station: sending an indication of whether the H-ARQ transmission from the wireless terminal to the base station is to be performed using collaborative spatial multiplexing or not; if the H-ARQ transmission from the wireless terminal to the base station is not performed using collaborative spatial multiplexing, the base station sending an indication of a transmission count that indicates a current number of times the transmit information has been transmitted including the current transmission; if the H-ARQ transmission from the wireless terminal to the base station is performed using collaborative spatial multiplexing, the base station sending an indication of a transmission count that indicates a number of times the transmit information has been transmitted including the current transmission for each wireless terminal used in the collaborative spatial multiplexing.

In some embodiments, if the transmission does not use collaborative spatial multiplexing the base station further sends an indication of whether space-time transmit diversity (STTD) or spatial multiplexing (SM) is used for transmitting the H-ARQ transmission.

In some embodiments, sending an identification of the H-ARQ transmission for a non-MIMO enabled wireless terminal comprises sending an indication of when a new packet, which includes the H-ARQ transmission, is being transmitted and sending an identification of a sub-packet, which includes at least a portion of the H-ARQ transmission, that is being transmitted.

In some embodiments, sending an identification of the H-ARQ transmission for a non-MIMO enabled wireless terminal comprises sending an indication of a transmission count that indicates a number of times the transmit information has been transmitted including the current transmission.

In some embodiments, sending the wireless terminal location information comprises either sending both an indication of an initial starting point of a region for the transmission resource allocation in the data frame and an indication of the size of the region for the transmission resource allocation in the data frame, or sending an indication of a duration of a region for the transmission resource allocation in the data frame.

According to a second aspect of the invention, there is provided a method in a multi-antenna enabled base station for operating a hybrid automatic repeat request (H-ARQ) enabled OFDM (orthogonal frequency multiplexing) connection with a wireless terminal, the method comprising: the base station sending the wireless terminal an indication of the number of transmission resource allocations to be made in a data frame; for each resource allocation the base station: sending an indication of a transmission count that indicates a number of times the H-ARQ transmission has been transmitted from the base station to the wireless terminal including the current transmission, if it is a first attempt at sending the H-ARQ transmission; sending the wireless terminal positional information of where H-ARQ transmission is located in the data frame; sending an identification of a channel on which the H-ARQ transmission is being transmitted.

In some embodiments, the H-ARQ enabled connection with a wireless terminal comprises a connection for transmission in either a down-link (DL) direction from the base station to the wireless terminal or an up-link (UL) direction from the wireless terminal to the base station.

In some embodiments, a transmission matrix used to send the H-ARQ transmission to the wireless terminal is determined by the number of antennas in the multi-antenna enabled base station.

In some embodiments, the base station sending information to the wireless terminals comprises the base station sending the information in an information element (IE) of the data frame, the data frame transmitted from the base station to the at least one wireless terminal.

In some embodiments, the base station sending the information in an IE comprises the base station sending the IE as a plurality of fields in the data frame, each field comprising one or more bits.

According to a third aspect of the invention, there is provided method in a wireless terminal for operating a hybrid automatic repeat request (H-ARQ) enabled OFDM (orthogonal frequency multiplexing) connection with a base station, the method comprising: the wireless terminal receiving an indication of a total number of transmission resource allocations to be made in a data frame; for each transmission resource allocation, the wireless terminal: receiving the wireless terminal location information of where a H-ARQ transmission is located in the data frame; receiving an identification of a channel on which the H-ARQ transmission is being transmitted; receiving an identification of the H-ARQ transmission.

In some embodiments, the H-ARQ enabled connection is an incremental redundancy (IR) based H-ARQ enabled connection or a Chase based H-ARQ enabled connection.

According to a fourth aspect of the invention, there is provided a method for use in a base station for resource management of resources in a network, the method comprising transmitting in a frame: at least one non-encrypted mapping message that is readable by any wireless terminal to aid in a wireless terminal initially accessing the network; at least one encrypted mapping message that is readable by only a wireless terminal authenticated as being registered with the network, the at least one encrypted mapping message comprising information pertaining to resource management of the network.

In some embodiments, the at least one non-encrypted mapping message is a down-link mapping message comprising at least one pointer to other non-encrypted mapping messages and/or at least one encrypted mapping message.

In some embodiments, the at least one non-encrypted mapping message is an up-link mapping message comprising at least one pointer to regions in the frame used for transmission from the wireless terminal to the base station designated for arranging access to the network.

In some embodiments, the at least one encrypted mapping message is an up-link mapping message comprising pointers to regions in the frame used for transmission from the wireless terminal to the base station designated for requesting additional up-link resources in from the base station.

In some embodiments, the method further comprises: after a wireless terminal has been authenticated as being registered with the network, the base station transmitting an encryption key to the authenticated wireless terminal to enable encryption and decryption of transmissions between the base station and the wireless terminals.

In some embodiments, the encryption key is an encryption key pair comprising a public encryption key that is known to the base station or any wireless terminal and a private encryption key known only to the registered wireless terminal to which it is assigned.

According to a fifth aspect of the invention, there is provided a method for use in a wireless terminal for requesting transmission resources in a network from a base station, the method comprising: receiving a data frame transmitted by the base station providing a first non-encrypted mapping message including a pointer to a second non-encrypted mapping message utilized in initially accessing the network; transmitting a request to the base station to gain access to the network in a portion of an up-link subframe identified by the second non-encrypted mapping message; following authentication of the wireless terminal as a registered wireless terminal with the network by the base station, the authenticated wireless terminal: receiving an encryption key from the base station to decrypt encrypted transmissions from the base station; receiving an encrypted mapping message providing a location in the up-link subframe of the data frame in which a resource allocation request can be sent by the wireless terminal to the base station; decrypting the encrypted mapping message from the base station; and transmitting the resource allocation request in an up-link subframe of the data frame to the base station; and if the wireless terminal is not authenticated by the base station to be registered with the network, the wireless terminal is incapable of decrypting encrypted transmissions from the base station identifying where in a subsequent data frame the wireless terminal is allowed to send a resource allocation request.

According to another aspect of the invention, there is provided a base station adapted to implement embodiments of the inventive methods described above.

According to a further aspect of the invention, there is provided a wireless terminal adapted to implement embodiments of the inventive methods described above.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Preferred embodiments of the invention will now be described with reference to the attached drawings in which:

FIG. 7 is a signaling diagram for communication between a base station and a wireless terminal according to an embodiment of the invention;

FIG. 8 is a signaling diagram for communication between a base station and a wireless terminal according to another embodiment of the invention;

FIG. 18 is a resource management message transmission scheme according to the IEEE 802.16(e)/D5 draft version if the IEEE 802.16 standard;

FIG. 19 is a resource management transmission scheme according to an embodiment of the invention.

DETAILED DESCRIPTION OF THE PREFERRED EMBODIMENTS

Figure 1:
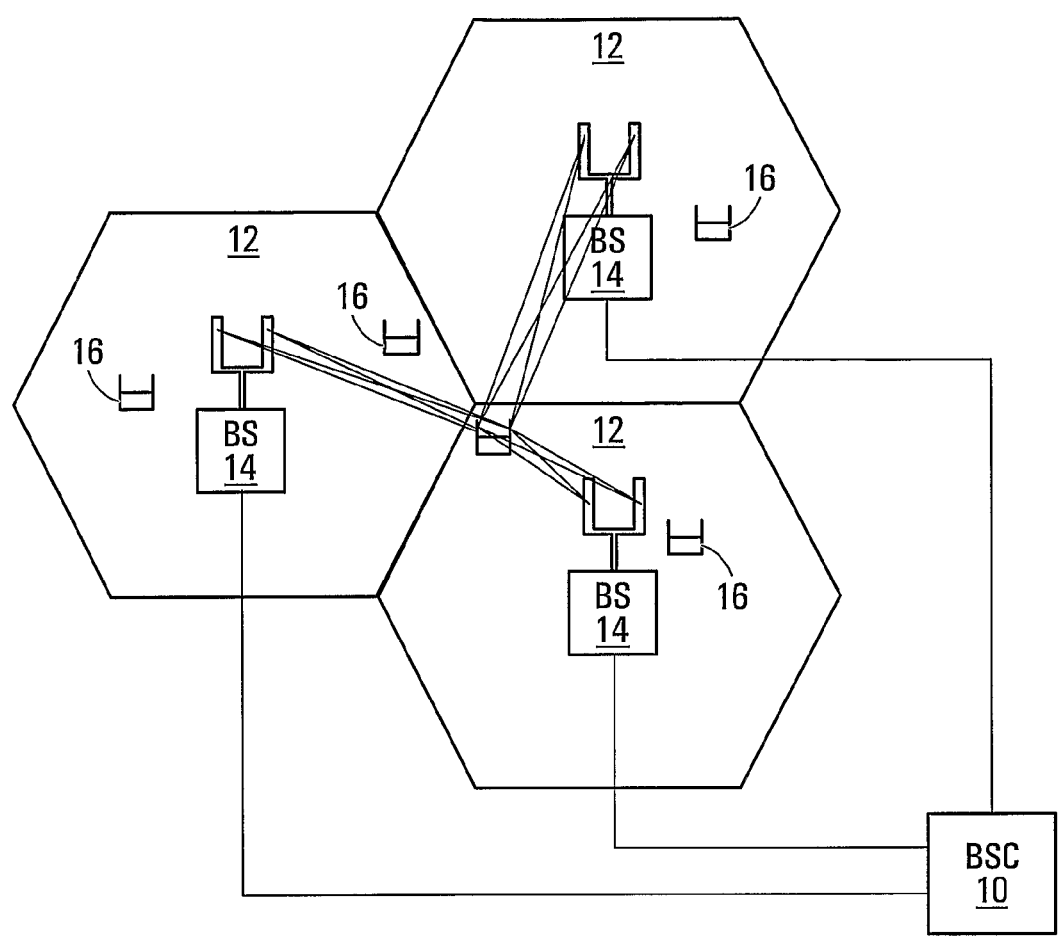
FIG. 1 is a block diagram of a cellular communication system.

For the purposes of providing context for embodiments of the invention for use in a communication system, FIG. 1 shows a base station controller (BSC) 10 which controls wireless communications within multiple cells 12, which cells are served by corresponding base stations (BS) 14. In general, each base station 14 facilitates communications using OFDM with mobile and/or wireless terminals 16, which are within the cell 12 associated with the corresponding base station 14. The movement of the mobile terminals 16 in relation to the base stations 14 results in significant fluctuation in channel conditions. As illustrated, the base stations 14 and mobile terminals 16 may include multiple antennas to provide spatial diversity for communications.

Figure 2:
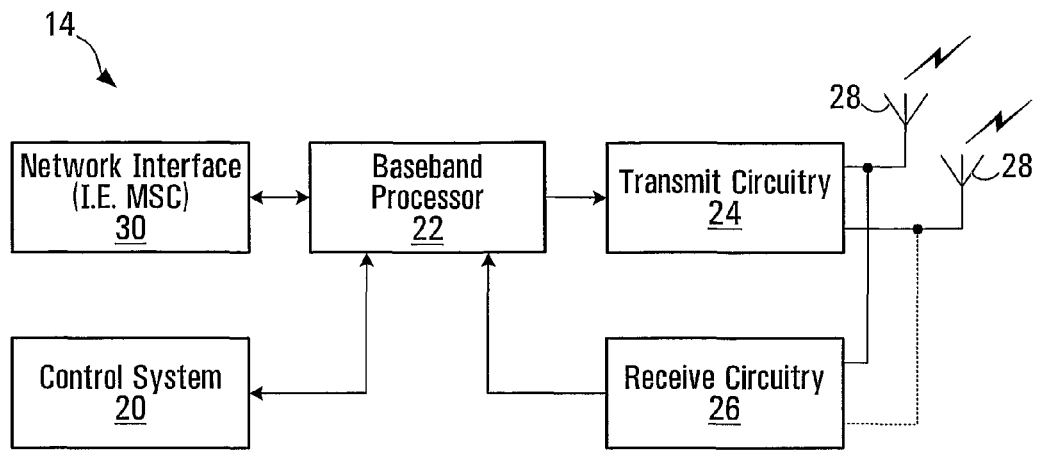
FIG. 2 is a block diagram of an example base station that might be used to implement some embodiments of the present invention.

A high level overview of the mobile terminals 16 and base stations 14 upon which aspects of the present invention are implemented is provided prior to delving into the structural and functional details of the preferred embodiments. With reference to FIG. 2, a base station 14 is illustrated. The base station 14 generally includes a control system 20, a baseband processor 22, transmit circuitry 24, receive circuitry 26, multiple antennas 28, and a network interface 30. The receive circuitry 26 receives radio frequency signals bearing information from one or more remote transmitters provided by mobile terminals 16 (illustrated in FIG. 1). Preferably, a low noise amplifier and a filter (not shown) cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 22 processes the digitized received signal to extract the information or data bits conveyed in the received signal. This processing typically comprises demodulation, decoding, and error correction operations. As such, the baseband processor 22 is generally implemented in one or more digital signal processors (DSPs) or application-specific integrated circuits (ASICs). The received information is then sent across a wireless network via the network interface 30 or transmitted to another mobile terminal 16 serviced by the base station 14.

On the transmit side, the baseband processor 22 receives digitized data, which may represent voice, data, or control information, from the network interface 30 under the control of control system 20, and encodes the data for transmission. The encoded data is output to the transmit circuitry 24, where it is modulated by a carrier signal having a desired transmit frequency or frequencies. A power amplifier (not shown) will amplify the modulated carrier signal to a level appropriate for transmission, and deliver the modulated carrier signal to the antennas 28 through a matching network (not shown). Various modulation and processing techniques available to those skilled in the art are used for signal transmission between the base station and the mobile terminal.

Figure 3:
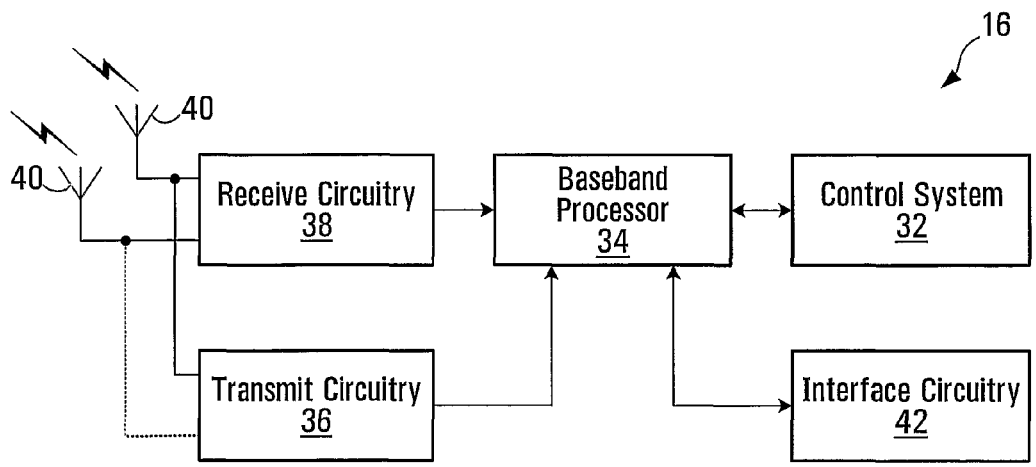
FIG. 3 is a block diagram of an example wireless terminal that might be used to implement some embodiments of the present invention.

With reference to FIG. 3, a mobile terminal 16 configured according to one embodiment of the present invention is illustrated. Similarly to the base station 14, the mobile terminal 16 will include a control system 32, a baseband processor 34, transmit circuitry 36, receive circuitry 38, multiple antennas 40, and user interface circuitry 42. The receive circuitry 38 receives radio frequency signals bearing information from one or more base stations 14. Preferably, a low noise amplifier and a filter (not shown) cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 34 processes the digitized received signal to extract the information or data bits conveyed in the received signal. This processing typically comprises demodulation, decoding, and error correction operations. The baseband processor 34 is generally implemented in one or more digital signal processors (DSPs) and application specific integrated circuits (ASICs).

For transmission, the baseband processor 34 receives digitized data, which may represent voice, data, or control information, from the control system 32, which it encodes for transmission. The encoded data is output to the transmit circuitry 36, where it is used by a modulator to modulate a carrier signal that is at a desired transmit frequency or frequencies. A power amplifier (not shown) will amplify the modulated carrier signal to a level appropriate for transmission, and deliver the modulated carrier signal to the antennas 40 through a matching network (not shown). Various modulation and processing techniques available to those skilled in the art are used for signal transmission between the mobile terminal and the base station.

In OFDM modulation, the transmission band is divided into multiple, orthogonal carrier waves. Each carrier wave is modulated according to the digital data to be transmitted. Because OFDM divides the transmission band into multiple carriers, the bandwidth per carrier decreases and the modulation time per carrier increases. Since the multiple carriers are transmitted in parallel, the transmission rate for the digital data, or symbols, on any given carrier is lower than when a single carrier is used.

OFDM modulation utilizes the performance of an Inverse Fast Fourier Transform (IFFT) on the information to be transmitted. For demodulation, the performance of a Fast Fourier Transform (FFT) on the received signal recovers the transmitted information. In practice, the IFFT and FFT are provided by digital signal processing carrying out an Inverse Discrete Fourier Transform (IDFT) and Discrete Fourier Transform (DFT), respectively. Accordingly, the characterizing feature of OFDM modulation is that orthogonal carrier waves are generated for multiple bands within a transmission channel. The modulated signals are digital signals having a relatively low transmission rate and capable of staying within their respective bands. The individual carrier waves are not modulated directly by the digital signals. Instead, all carrier waves are modulated at once by IFFT processing.

In operation, OFDM is preferably used for at least downlink transmission from the base stations 14 to the mobile terminals 16. Each base station 14 is equipped with "n" transmit antennas 28, and each mobile terminal 16 is equipped with "m" receive antennas 40. Notably, the respective antennas can be used for reception and transmission using appropriate duplexers or switches and are so labeled only for clarity.

Figure 4:
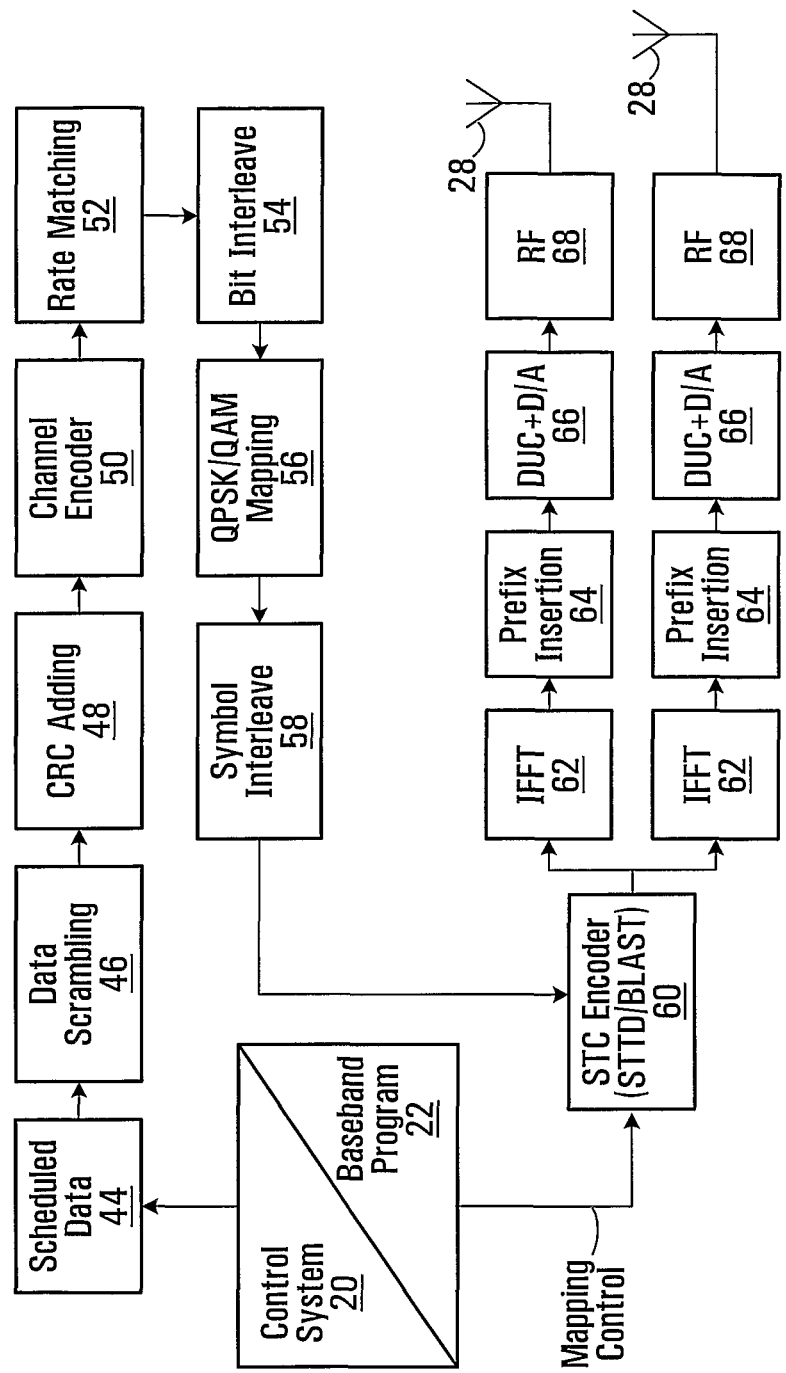
FIG. 4 is a block diagram of a logical breakdown of an example OFDM transmitter architecture that might be used to implement some embodiments of the present invention.

With reference to FIG. 4, a logical OFDM transmission architecture will be described. Initially, the base station controller 10 will send data to be transmitted to various mobile terminals 16 to the base station 14. The base station 14 may use the channel quality indicators (CQIs) associated with the mobile terminals to schedule the data for transmission as well as select appropriate coding and modulation for transmitting the scheduled data. The CQIs may be directly from the mobile terminals 16 or determined at the base station 14 based on information provided by the mobile terminals 16. In either case, the CQI for each mobile terminal 16 is a function of the degree to which the channel amplitude (or response) varies across the OFDM frequency band.

Scheduled data 44, which is a stream of bits, is scrambled in a manner reducing the peak-to-average power ratio associated with the data using data scrambling logic 46. A cyclic redundancy check (CRC) for the scrambled data is determined and appended to the scrambled data using CRC adding logic 48. Next, channel coding is performed using channel encoder logic 50 to effectively add redundancy to the data to facilitate recovery and error correction at the mobile terminal 16. Again, the channel coding for a particular mobile terminal 16 is based on the CQI. In some implementations, the channel encoder logic 50 uses known Turbo encoding techniques. The encoded data is then processed by rate matching logic 52 to compensate for the data expansion associated with encoding.

Bit interleaver logic 54 systematically reorders the bits in the encoded data to minimize the loss of consecutive data bits. The resultant data bits are systematically mapped into corresponding symbols depending on the chosen baseband modulation by mapping logic 56. Preferably, Quadrature Amplitude Modulation (QAM) or Quadrature Phase Shift Key (QPSK) modulation is used. The degree of modulation is preferably chosen based on the CQI for the particular mobile terminal. The symbols may be systematically reordered to further bolster the immunity of the transmitted signal to periodic data loss caused by frequency selective fading using symbol interleaver logic 58.

At this point, groups of bits have been mapped into symbols representing locations in an amplitude and phase constellation. When spatial diversity is desired, blocks of symbols are then processed by space-time block code (STC) encoder logic 60, which modifies the symbols in a fashion making the transmitted signals more resistant to interference and more readily decoded at a mobile terminal 16. The STC encoder logic 60 will process the incoming symbols and provide "n" outputs corresponding to the number of transmit antennas 28 for the base station 14. The control system 20 and/or baseband processor 22 as described above with respect to FIG. 2 will provide a mapping control signal to control STC encoding. At this point, assume the symbols for the "n" outputs are representative of the data to be transmitted and capable of being recovered by the mobile terminal 16.

For the present example, assume the base station 14 has two antennas 28 (n=2) and the STC encoder logic 60 provides two output streams of symbols. Accordingly, each of the symbol streams output by the STC encoder logic 60 is sent to a corresponding IFFT processor 62, illustrated separately for ease of understanding. Those skilled in the art will recognize that one or more processors may be used to provide such digital signal processing, alone or in combination with other processing described herein. The IFFT processors 62 will preferably operate on the respective symbols to provide an inverse Fourier Transform. The output of the IFFT processors 62 provides symbols in the time domain. The time domain symbols are grouped into frames, which are associated with a prefix by prefix insertion logic 64. Each of the resultant signals is up-converted in the digital domain to an intermediate frequency and converted to an analog signal via the corresponding digital up-conversion (DUC) and digital-to-analog (D/A) conversion circuitry 66. The resultant (analog) signals are then simultaneously modulated at the desired RF frequency, amplified, and transmitted via the RF circuitry 68 and antennas 28. Notably, pilot signals known by the intended mobile terminal 16 are scattered among the sub-carriers. The mobile terminal 16, which is discussed in detail below, will use the pilot signals for channel estimation.

Figure 5:
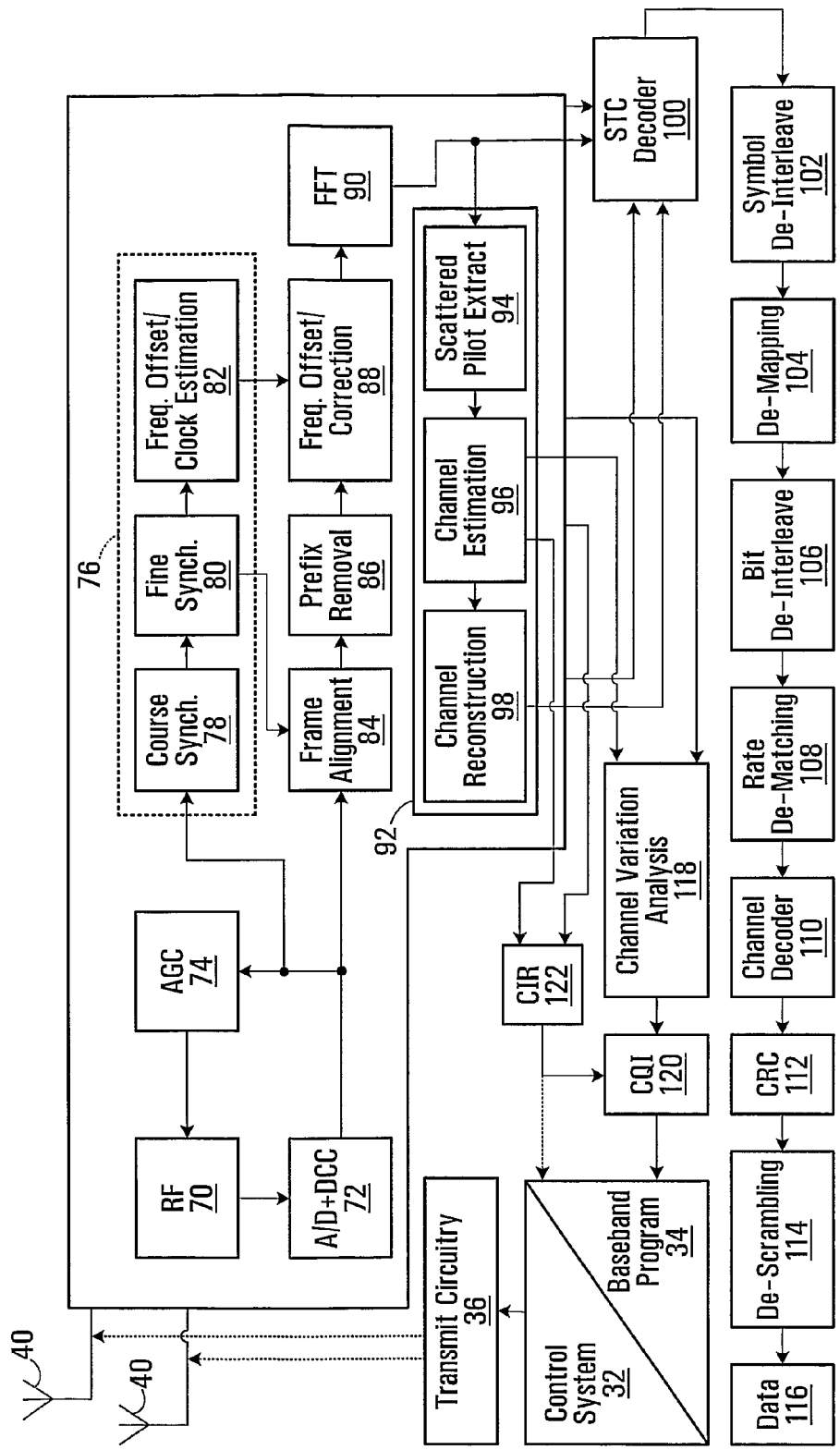
FIG. 5 is a block diagram of a logical breakdown of an example OFDM receiver architecture that might be used to implement some embodiments of the present invention.

Reference is now made to FIG. 5 to illustrate reception of the transmitted signals by a mobile terminal 16. Upon arrival of the transmitted signals at each of the antennas 40 of the mobile terminal 16, the respective signals are demodulated and amplified by corresponding RF circuitry 70. For the sake of conciseness and clarity, only one of the two receive paths is described and illustrated in detail. Analog-to-digital (A/D) converter and down-conversion circuitry 72 digitizes and downconverts the analog signal for digital processing. The resultant digitized signal may be used by automatic gain control circuitry (AGC) 74 to control the gain of the amplifiers in the RF circuitry 70 based on the received signal level.

Initially, the digitized signal is provided to synchronization logic 76, which includes coarse synchronization logic 78, which buffers several OFDM symbols and calculates an auto-correlation between the two successive OFDM symbols. A resultant time index corresponding to the maximum of the correlation result determines a fine synchronization search window, which is used by fine synchronization logic 80 to determine a precise framing starting position based on the headers. The output of the fine synchronization logic 80 facilitates frame acquisition by frame alignment logic 84. Proper framing alignment is important so that subsequent FFT processing provides an accurate conversion from the time domain to the frequency domain. The fine synchronization algorithm is based on the correlation between the received pilot signals carried by the headers and a local copy of the known pilot data. Once frame alignment acquisition occurs, the prefix of the OFDM symbol is removed with prefix removal logic 86 and resultant samples are sent to frequency offset correction logic 88, which compensates for the system frequency offset caused by the unmatched local oscillators in the transmitter and the receiver. Preferably, the synchronization logic 76 includes frequency offset and clock estimation logic 82, which is based on the headers to help estimate such effects on the transmitted signal and provide those estimations to the correction logic 88 to properly process OFDM symbols.

At this point, the OFDM symbols in the time domain are ready for conversion to the frequency domain using FFT processing logic 90. The results are frequency domain symbols, which are sent to processing logic 92. The processing logic 92 extracts the scattered pilot signal using scattered pilot extraction logic 94, determines a channel estimate based on the extracted pilot signal using channel estimation logic 96, and provides channel responses for all sub-carriers using channel reconstruction logic 98. In order to determine a channel response for each of the sub-carriers, the pilot signal is essentially multiple pilot symbols that are scattered among the data symbols throughout the OFDM sub-carriers in a known pattern in both time and frequency. Examples of scattering of pilot symbols among available sub-carriers over a given time and frequency plot in an OFDM environment are found in PCT Patent Application No. PCT/CA2005/000387 filed Mar. 15, 2005 assigned to the same assignee of the present application. Continuing with FIG. 5, the processing logic compares the received pilot symbols with the pilot symbols that are expected in certain sub-carriers at certain times to determine a channel response for the sub-carriers in which pilot symbols were transmitted. The results are interpolated to estimate a channel response for most, if not all, of the remaining sub-carriers for which pilot symbols were not provided. The actual and interpolated channel responses are used to estimate an overall channel response, which includes the channel responses for most, if not all, of the sub-carriers in the OFDM channel.

The frequency domain symbols and channel reconstruction information, which are derived from the channel responses for each receive path are provided to an STC decoder 100, which provides STC decoding on both received paths to recover the transmitted symbols. The channel reconstruction information provides equalization information to the STC decoder 100 sufficient to remove the effects of the transmission channel when processing the respective frequency domain symbols The recovered symbols are placed back in order using symbol de-interleaver logic 102, which corresponds to the symbol interleaver logic 58 of the transmitter. The de-interleaved symbols are then demodulated or de-mapped to a corresponding bitstream using de-mapping logic 104. The bits are then de-interleaved using bit de-interleaver logic 106, which corresponds to the bit interleaver logic 54 of the transmitter architecture. The de-interleaved bits are then processed by rate de-matching logic 108 and presented to channel decoder logic 110 to recover the initially scrambled data and the CRC checksum. Accordingly, CRC logic 112 removes the CRC checksum, checks the scrambled data in traditional fashion, and provides it to the de-scrambling logic 114 for de-scrambling using the known base station de-scrambling code to recover the originally transmitted data 116.

In parallel to recovering the data 116, a CQI, or at least information sufficient to create a CQI at the base station 14, is determined and transmitted to the base station 14. As noted above, the CQI may be a function of the carrier-to-interference ratio (CR), as well as the degree to which the channel response varies across the various sub-carriers in the OFDM frequency band. The channel gain for each sub-carrier in the OFDM frequency band being used to transmit information is compared relative to one another to determine the degree to which the channel gain varies across the OFDM frequency band. Although numerous techniques are available to measure the degree of variation, one technique is to calculate the standard deviation of the channel gain for each sub-carrier throughout the OFDM frequency band being used to transmit data.

FIGS. 1 to 5 each provide a specific example of a communication system or elements of a communication system that could be used to implement embodiments of the invention. It is to be understood that embodiments of the invention can be implemented with communications systems having architectures that are different than the specific example, but that operate in a manner consistent with the implementation of the embodiments as described herein.

A MAC (media access control) layer is used to enable features in the physical (PHY) layer in an OFDM air interface framework. Frames are a format used to transmit data over the air interface between base stations (BS) and wireless terminals. A wireless terminal, as referred to hereafter, is any OFDM capable wireless device and may be fixed location, nomadic or mobile, for example a cellular telephone, computer with a wireless modem, or PDA. The frame also includes information elements (IE) to provide a structure within the frame for defining where down-link and up-link transmissions are located within the frame.

Figure 6:
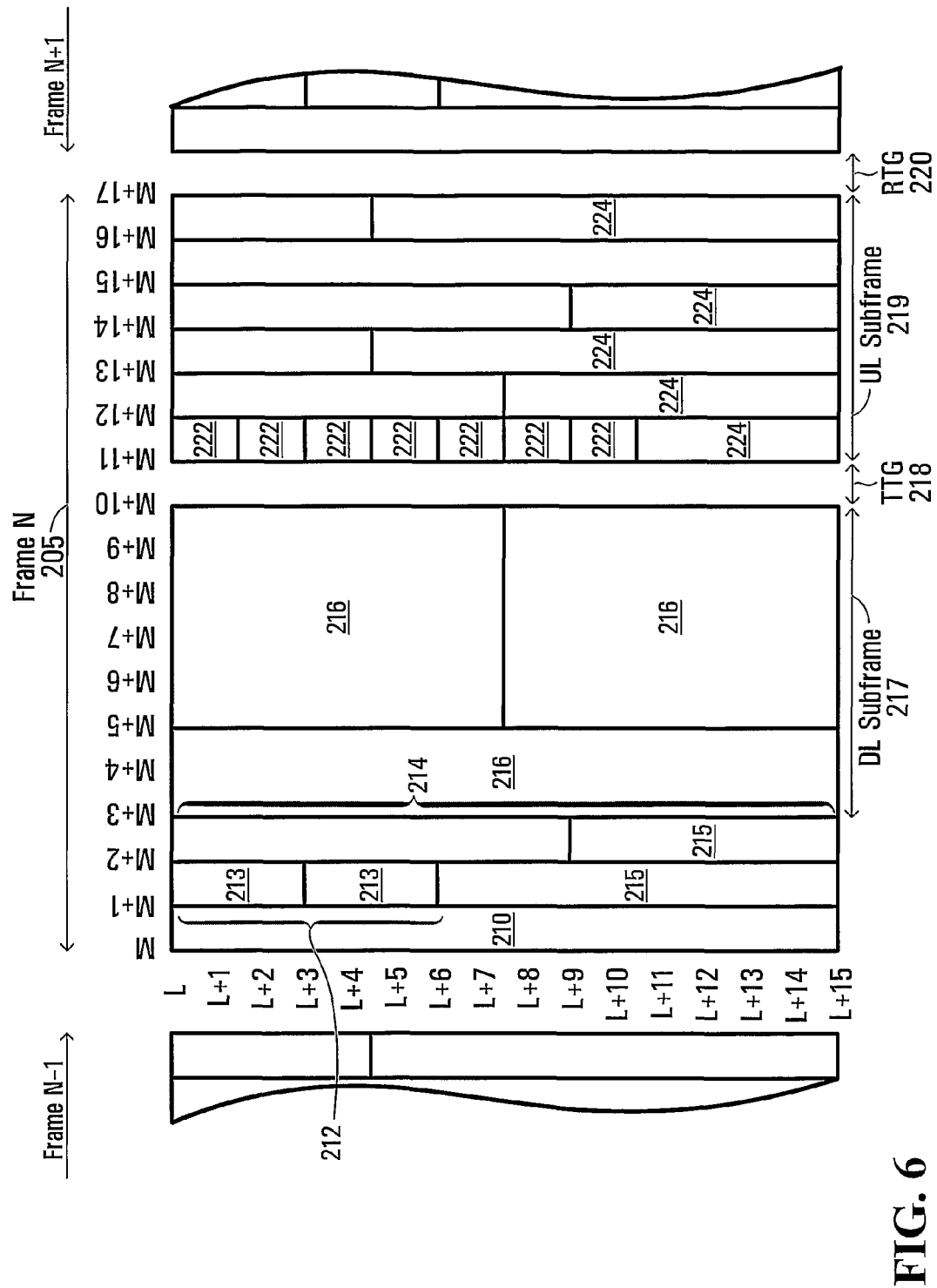
FIG. 6 is a schematic view of an OFDM frame for use with embodiments provided by the invention.

FIG. 6 shows a schematic diagram of an example frame used in conjunction with embodiments of the invention. Details are shown for a frame labelled "Frame N", generally indicated at 205, which is preceded by "Frame N−1" and followed by "Frame N+1", all forming part of an ongoing sequence of frames. The frame has a two dimensional appearance which is represented in terms of a rows and columns. The rows are designated by logical subchannel numbers L, L+1, . . . L+15 and the columns are designated by OFDM symbol numbers M, M+1, . . . M+15. Logical subchannels are designated groupings of active subcarriers. Active subcarriers are any one of data subcarriers for data transmission, pilot subcarriers for synchronization, or subcarriers that do not involve direct transmission, but are used as transition guards between parts of the frame. In the frame N of FIG. 6, a preamble 210 is included in a first OFDM symbol M. A second OFDM symbol M+1 and a third OFDM symbol M+2 include both a down-link (DL) mapping component 212 (more commonly referred to as a DL MAP message in the IEEE 802.16 standard) including one or more information elements 213 and an up-link (UL) mapping component 214 (more commonly referred to as a UL MAP message in the IEEE 802.16 standard) including one or more information elements 215. Other broadcast messages (not shown) may be included as well. Subsequent OFDM symbols M+3 through M+9 contain a DL subframe 217. The DL subframe 217 contains DL information allocated to regions 216 of the DL subframe 217 to be transmitted to one or more wireless terminals by the base station. Following the DL subframe 217 is a transmit/receive/transition guard (TTG) 218, shown during OFDM symbol period M+10. After the TTG 218 is a UL subframe 219 containing UL information allocated to designated regions 224 of the UL subframe to be transmitted back to the base station by the one or more wireless terminals. The UL subframe 219 also includes fast feedback channels 222 that are used to allow the mobile terminal to report information to the base station. For example a fast feedback channel 222 can be designated as a channel to indicate the air interface channel quality between the base station and the mobile terminal. Following the UL subframe 219 is a receive/transmit transition guard (RTG) 220. Frames N−1 and N+1 have a similar composition.

Regions 216 of the DL subframe 217 contain MAC protocol data units (PDU). Regions 224 of the UL subframe 219 also contain MAC PDUs. MAC PDUs are known to include some or all of the following: a MAC header, MAC subheaders and a MAC payload.

The data frame of FIG. 6 is an example of a time division duplex (TDD) data frame. It is to be understood that embodiments of the invention are also applicable to frequency division duplex (FDD) operation.

The illustrated frame structure is a specific example. The preamble, mapping components, DL subframe and UL subframe may be implemented using an implementation specific number of OFDM symbols, with implementation specific guard bands. The number and definition of OFDM subchannels is also an implementation detail. The layout sequence of the various fields can also be varied.

Each region 216 of the DL subframe 217 and/or each region 224 of the UL subframe 219 may contain multiple packets of MAC PDU information. In order to facilitate down-link data transmission by a base station to a wireless terminal, some feedback information, such as C/I (carrier-to-interference) measurements, and/or wireless terminal indications, such as MIMO (multiple input multiple output)/permutation modes, are sent from the wireless terminal.

An automatic repeat request (ARQ) scheme involves, in a communication between two devices, a device receiving a transmission from a transmitting device automatically sending an acknowledgement (ACK) of a received and decoded message or a negative acknowledgement (NAK) of a message that is not received or not able to be decoded. The NAK generally acts as a request for re-transmission of the originally transmitted transmission.

In conventional ARQ schemes transmission errors are generally determined at the receiver by an error detection code. In an enhancement to ARQ, known as hybrid automatic repeat request (H-ARQ), error detection of the ARQ scheme is combined with an error correcting to create a scheme to increase the probability of successful transmission.

The embodiments of the invention described below provide methods for implementing OFDM H-ARQ communications between a base station and one or more wireless terminals using an existing DL MAP structure in the IEEE 802.16 standard. The DL MAP structure has both the DL mapping component region and the UL mapping component region as described above with regard to FIG. 6.

More generally, it is to be understood that the methods can be applied to other types of H-ARQ based communication in addition to those supported in the IEEE 802.16 standard.

Three different types of H-ARQ enabled communications being implemented with the methods described herein include incremental redundancy (IR) based H-ARQ, Chase based H-ARQ, and STC (space-timing code combining) based H-ARQ. With respect to IR based H-ARQ and Chase based H-ARQ, methods and systems are described herein that are appropriate for either MIMO or non-MIMO capable wireless terminals. With respect to STC based H-ARQ, methods and systems are provided that are appropriate for MIMO capable wireless terminals.

In H-ARQ schemes a MAC layer PDU is transferred to the PHY layer and a PHY layer PDU is created and transmitted to a receiver. At the receiving device, the received PHY layer PDU is transferred to the MAC layer where it is decoded.

In some embodiments, transmission using IR based H-ARQ involves a base station sending encoded information to a wireless terminal on a channel for H-ARQ transmissions with a specific identification (H-ARQ channel ID). If the wireless terminal does not properly receive and decode the encoded information, the wireless terminal sends a NAK to the base station requesting retransmission on the H-ARQ transmission channel with the same ID as the original encoded information. The base station then sends additional encoded information to the wireless terminal on the same H-ARQ transmission channel to aid the wireless terminal in decoding the original encoded information. Typically, the additional encoded information is select parity bits. If the base station receives a further NAK from the wireless terminal the base station sends further additional encoded information to the wireless terminal on the same H-ARQ transmission channel. The further additional encoded information may be a different selection of parity bits from the first selection of parity bits. This process continues until the wireless terminal properly receives and decodes the original encoded information or until a pre-determined number of additional encoded information packets are sent. The additional selections of encoded information do not typically include all the same data of the first encoded information. This allows for a more efficient use of transmission bandwidth, as instead of re-transmitting an entire message to the wireless terminal multiple times, the base station may subsequently send smaller selections of encoded information to aid in properly decoding the original encoded information.

For example, encoded information may be a PHY layer PDU including a MAC PDU or a portion of a MAC PDU along with redundancy or parity bits that are used to aid in error correction of the encoded information, when errors are detected subsequent to transmission. In some embodiments, the PHY layer PDU is divided into more than one sub-packet. A first sub-packet contains all of or the portion of the MAC PDU and also may include some of the parity bits. The remaining sub-packets include the remainder the parity bits. The parity bits in the other sub-packets may each contain a random selection of the remaining parity bits from the sequential order of parity bits that make up the PHY PDU. A typical number of sub-packets may be four. However, the number of sub-packets may be greater than or less than four depending on the desired implementation.

In some embodiments, multiple H-ARQ channels are used for transmission of PHY layer PDUs as transmission of a single PHY layer PDU occurs over more than one transmission frame due to the temporal nature of transmission of information between the base station and receiver. For example in the IR based H-ARQ scheme, the base station transmits the first sub-packet in a first frame, if the first sub-packet is not successfully received the receiver must send a NAK back in a subsequent frame. After the NAK is received at the base station, another frame is used to send the second sub-packet. As this process may occur for multiple simultaneous PHY layer PDUs transmitted to one or more than one receiver, the use of multiple H-ARQ channels is advantageous.

As an example, a first encoded PHY layer PDU sub-packet is transmitted from the base station to the wireless terminal, which includes the MAC PDU or portion thereof and select parity bits. Encoded PHY layer PDU sub-packets and the corresponding NAKs are transmitted on a channel identified for H-ARQ transmission over the connections established between the base station and the one or more wireless terminals. If the base station receives a NAK from the wireless terminal, the base station then sends a second PHY layer PDU sub-packet to the wireless terminal including different select parity bits than the parity bits sent with the first PHY layer PDU sub-packet. If the base station receives a further NAK from the wireless terminal the base station sends a third PHY layer PDU sub-packet to the wireless terminal of other select parity bits that have not yet been sent. This process continues until the wireless terminal properly receives and decodes the MAC PDU or portion thereof or when all the parity bits in the maximum number of sub-packets are eventually sent.

An example of IR based H-ARQ will now be described with respect to FIG. 7. FIG. 7 is a signaling diagram between a base station 710 and a wireless terminal 720 in which multiple H-ARQ channels are being used to transmit H-ARQ transmission in a DL direction in multiple DL regions of the frame. At 725, a first PHY layer PDU sub-packet with a sub-packet identification (SPID) equal to 1 is sent on a first H-ARQ transmission channel (ACID=1) by the base station 710 to the wireless terminal 720. At 730, a first PHY layer PDU sub-packet with a SPID equal to 1 is sent on a second H-ARQ channel (ACID=2) by the base station 710 to the wireless terminal 720. At 735, a first PHY layer PDU sub-packet with a SPID equal to 1 is sent on a third H-ARQ channel (ACID=3) by the base station 710 to the wireless terminal 720. At 740, a NAK is sent from the wireless terminal 720 to the base station 710 on ACID=1. In response to the received NAK on ACID=1, at 745 a second PHY layer PDU sub-packet is transmitted on ACID=1 with a SPID equal to 2 from the base station 710 to the wireless terminal 720. At 750, a NAK is sent from the wireless terminal 720 to the base station 710 on ACID=3. At 755, a first PHY layer PDU sub-packet with a SPID equal to 1 is sent on a fourth H-ARQ channel (ACID=4) by the base station 710 to the wireless terminal 720. In response to the received NAK on ACID=3, at 760 a second PHY layer PDU sub-packet is transmitted on ACID=3 with a SPID equal to 2 from the base station 710 to the wireless terminal 720. At 765, a new first PHY layer PDU sub-packet is transmitted on ACID=2 with a SPID equal to 1 from the base station 710 to the wireless terminal 720. This process continues until all PHY layer PDU sub-packets sent by the base station 710 are received by the wireless terminal 720. This example is directed to transmission of data or messages in the DL direction, but a similar process occurs in the UL direction.

In some embodiments, transmission using Chase based H-ARQ involves the base station sending encoded information on a channel for H-ARQ transmissions with a H-ARQ channel ID and then re-sending the entire encoded information each time a NAK is received from the wireless terminal indicating that the wireless terminal was not able to properly receive and/or decode the first encoded information. Chase based H-ARQ is considered to be less efficient than IR based H-ARQ as Chase based H-ARQ resends the entire encoded information each time a NAK is received, whereas IR based H-ARQ sends the encoded information and some parity bits in the first transmission and only select parity bits in subsequent transmissions when a NAK is received.

An example of Chase based H-ARQ will now be described with respect to FIG. 8. FIG. 8 is a signaling diagram between a base station 810 and a wireless terminal 820. At 825, a first PHY layer PDU packet is transmitted on a first H-ARQ channel (ACID=1) a first time (Tx_Count=1) by the base station 810 to the wireless terminal 820. At 830, a first PHY layer PDU packet is transmitted on a second H-ARQ channel (ACID=2) a first time (Tx_Count=1) by the base station 810 to the wireless terminal 820. At 835, a NAK is sent from the wireless terminal 820 to the base station 810 on ACID=2. At 840, a first PHY layer PDU packet is transmitted on a third H-ARQ channel (ACID=3) a first time (Tx_Count=1) by the base station 810 to the wireless terminal 820. In response to the received NAK on ACID=2, at 845 the first PHY layer PDU packet is re-transmitted (Tx_Count=2) on ACID=2 by the base station 810 to the wireless terminal 820. At 850, a new first PHY layer PDU packet is sent on ACID=1 a first time (Tx_Count=1) by the base station 810 to the wireless terminal 820. This process continues until all PHY layer PDU packets sent by the base station 810 are received by the wireless terminal 820. As with the IR based H-ARQ example above, this example is directed to transmission of data or messages in the DL direction, but a similar process occurs in the UL direction.

It is to be understood that the above examples take place over the course of multiple transmit frames as a NAK or re-transmission can only be sent in subsequent frames to an originally transmitted H-ARQ transmission. It is also to be understood that the same concept shown for the base station transmitting to the mobile terminal applies to the base station transmitting to more than one wireless terminal in different regions of the frame.

Transmission using STC based H-ARQ is similar to Chase based H-ARQ in that STC based H-ARQ involves the base station sending first encoded information and then re-sending the entire first encoded information each time a NAK is received from the wireless terminal. Using MIMO mode, it is possible to exploit spatial diversity to enhance H-ARQ performance through a particular transmission arrangement of the encoded information. In some embodiments, for STC based H-ARQ the base station indicates a transmission count to provide the receiving device with an indication of how many times the encoded information has been transmitted. In some embodiments of the invention, the transmitting device will send the receiving device location information for assignment of a region in the DL sub-frame of the data frame or the slot of the UL sub-frame of the data frame for the first encoded information only. Subsequent transmissions of encoded information are transmitted in the same assigned region or slot, so the receiving device knows where to locate the subsequent transmissions.

In MIMO mode transmission, if a received first packet including encoded information is in error, then a re-transmission is requested and the transmitter can use the same STC format as was originally sent to re-send the packet.

In this case, the packet can be re-transmitted using the same FEC encoded information or can be re-transmitted using different FEC redundancy, the re-transmitted packet and erroneous first packet can be combined in soft symbol form or can be decoded with the re-transmitted packet and erroneous first packet as a code combining.

A H-ARQ channel described above in the H-ARQ schemes for H-ARQ transmissions, and identified by a H-ARQ channel ID, in some embodiments, is one of many channels for H-ARQ transmissions assigned to a particular connection, identified by a connection identification (CID) between a base station and a wireless terminal.

In some embodiments, the H-ARQ schemes involve transmissions in the DL and UL directions where a transmitting device, that is the base station and/or the wireless terminal, maintains a queue of transmissions to be sent to a receiving device over consecutive data frames of the type described above. The base station provides an indication to both the base station itself and one or more wireless terminals of locations of transmission resources in the DL and UL sub-frames of the frame where the H-ARQ transmissions are to be transmitted. The base station and the one or more wireless terminals can then transmit the transmissions in the allocated resources according to the order of transmissions in the queue.

When the transmitting device receives a NAK from the receiving device, the transmitting device then schedules a re-transmission of the non-received transmission at an appropriate location within the queue such that a continuous flow of transmissions occurs on all H-ARQ channels and transmissions of no one H-ARQ channel falls behind in a transmission sequence. While transmissions of encoded information that arrive out of sequence are not a difficult problem to overcome due to the specific identification of each transmission of encoded information, it may become problematic if some of the packets become unmanageably out of sequence. The following methods for DL and UL direction H-ARQ transmissions involve how the base station assigns transmission resources from the base station to the wireless terminal or vice versa based on scheduling needs of the different H-ARQ schemes.

H-ARQ Transmissions in the Down-Link Direction

Figure 9:
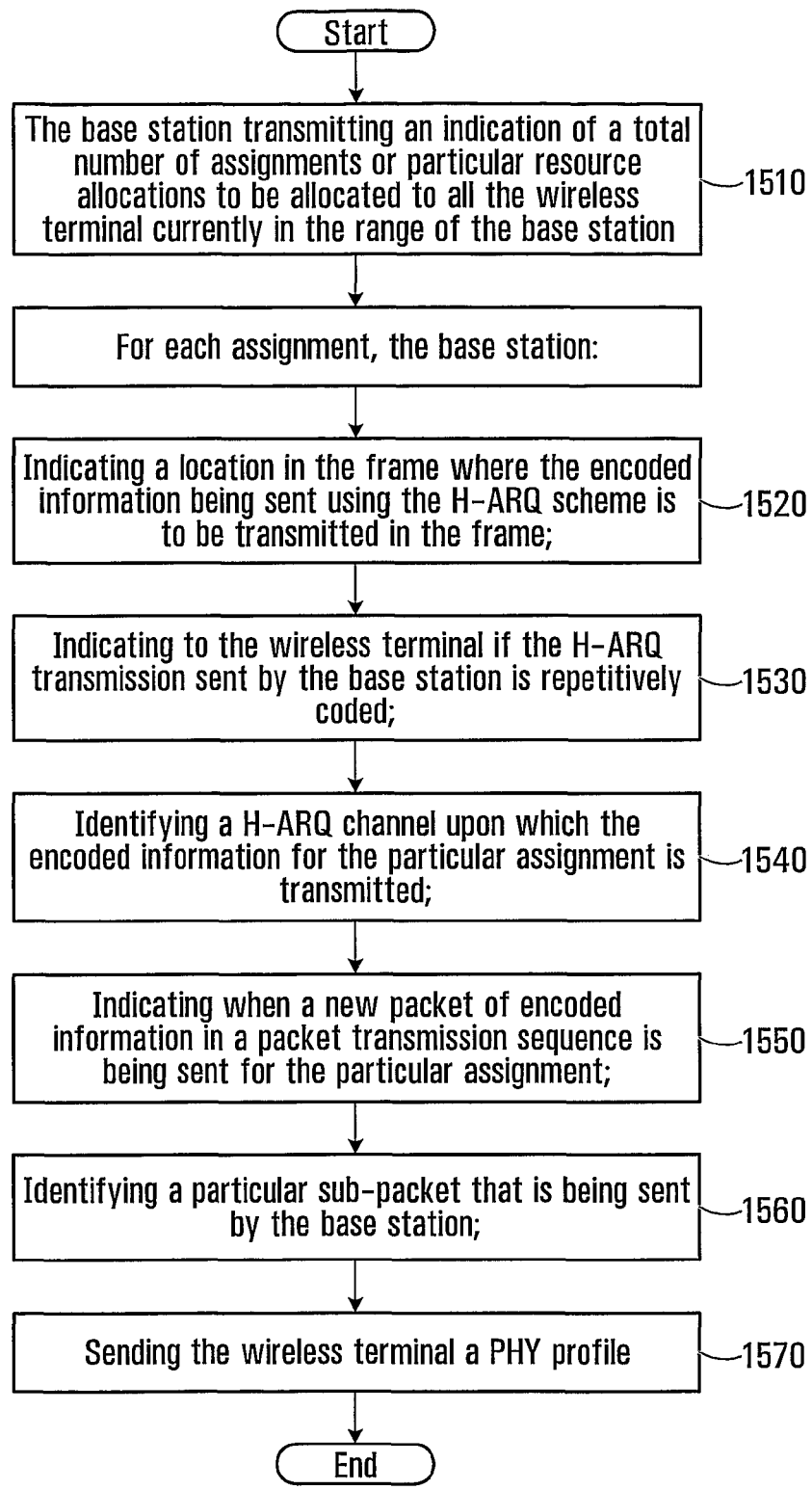
FIG. 9 is a flow chart for a method for a down-link (DL) direction IR based H-ARQ transmission scheme according to an embodiment of the invention.

Embodiments of the invention directed to a non-MIMO IR based H-ARQ scheme will now be described based on FIG. 9. The base station transmits an indication of a total number of assignments or particular resource allocations to be allocated to all the wireless terminal currently in the range of the base station at step 1510. Then for each assignment the base station indicates the location in the frame where the encoded information being sent using the IR based H-ARQ scheme is to be transmitted in the frame at step 1520. This may include such positional information as OFDM symbol offset and subchannel offset from a starting point within the frame and information indicating size of the particular allocated assignment such as a number of OFDM symbols and a number of sub-channels the H-ARQ transmission is to occupy. The base station may also send other information to the wireless terminal for each assignment, for example information relating to signal power of the transmission. The base station also sends an indication to the wireless terminal to identify if the H-ARQ transmission sent by the base station is repetitively coded at step 1530. For example, to ensure a more robust transmission the transmitted information may first be encoded multiple times for a single transmission. In some embodiments, the repetition coding indication involves the base station sending an indication of a quantity or number of times that the pre-coded data or message is repetitively encoded. This indication may be that the pre-coded data is repetitively coded 2, 4 or 6 times or possibly there are no repetitions and the information is only encoded once. The base station sends the wireless terminal an identification of a H-ARQ channel upon which the encoded information for the particular assignment is transmitted at step 1540. As described above each connection between the base station and the one or more wireless terminal can have more than one H-ARQ channel. The base station also sends the wireless terminal an indication of when a new packet of encoded information in a packet transmission sequence is being sent for the particular assignment at step 1550. In some embodiments for example, this indication may simply entail a single bit that is alternated between 0 and 1 each time a new packet is transmitted. For each assignment the base station also sends an identification of the particular sub-packet that is being sent by the base station at step 1560, for example the first, second or third sub-packet as generally described above. In some embodiments for each assignment the base station also sends the wireless terminal a PHY profile at step 1570, in the form of a down-link interval usage code (DIUC) and connection identification (CID). There may also be additional padding bits in the transmission from the base station to the wireless terminal to provide an integer number of bytes in the base station transmission.

The combined use of the H-ARQ channel ID, indication of when a new packet is transmitted and sub-packet ID is one example of how transmission and re-transmission of packets can be identified. It is to be understood that there may be alternative identification methods with fewer or more variables for proper identification of the packets being transmitted. For example, an indication of a first sub-packet may be sufficient as an indication of when a new packet is being transmitted and thus no specific indication of when a new packet is transmitted is used.

The above is an example for an IR based H-ARQ scheme. It is to be considered to be within the scope of the invention that not all of the particular indications and identifications are sent by the base station. In some embodiments, not all of the described indications or identification may be sent, or in some embodiments additional information may be sent by the base station to enhance the IR-based H-ARQ. The same can be said of all DL and UL direction H-ARQ schemes described herein.

Figure 10:
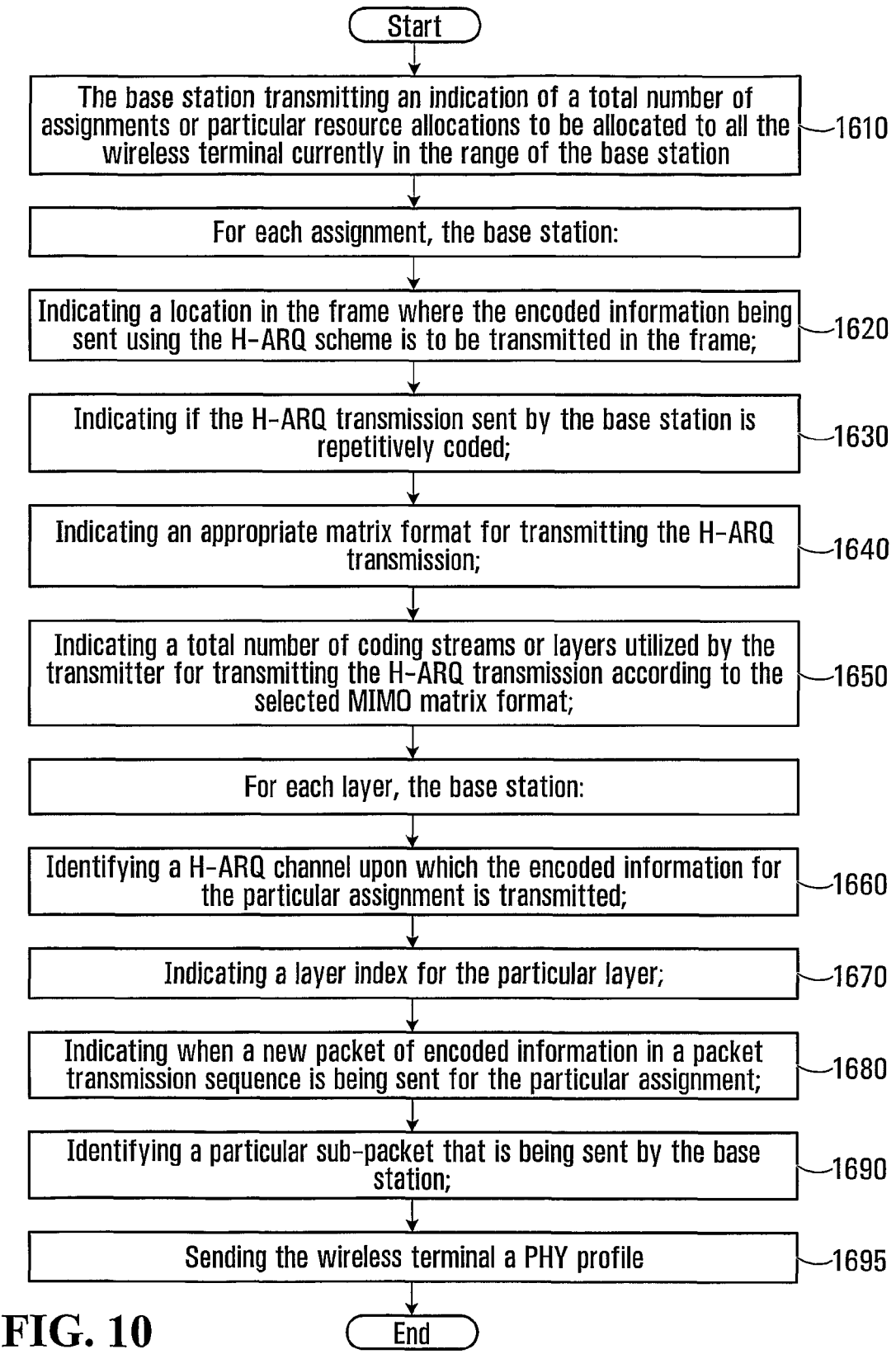
FIG. 10 is a flow chart for a method for another DL direction IR based H-ARQ transmission scheme according to an embodiment of the invention.

Embodiments of the invention directed to a MIMO IR based H-ARQ scheme will now be described based on FIG. 10. Utilizing MIMO IR based H-ARQ includes many of the aspects utilized in non-MIMO IR based H-ARQ with the addition of the base station identifying for each assignment a particular matrix format used for transmitting the H-ARQ transmission in an appropriate MIMO format at step 1640. The base station sends the wireless terminal an indication of the total number of coding streams or layers utilized by the transmitter for transmitting the H-ARQ transmission according to the selected MIMO matrix format at step 1650. For each coding stream or layer the base station sends the wireless terminal a PHY profile (step 1695) in the form of a DIUC and CID, an indication of the layer index (step 1660), an indication of the H-ARQ channel identification (step 1670), an indication of the packet sequence number (step 1680) and an indication of the sub-packet ID (step 1690). There may also be additional padding bits in the transmission to provide an integer number of bytes in the base station transmission.

Figure 11:
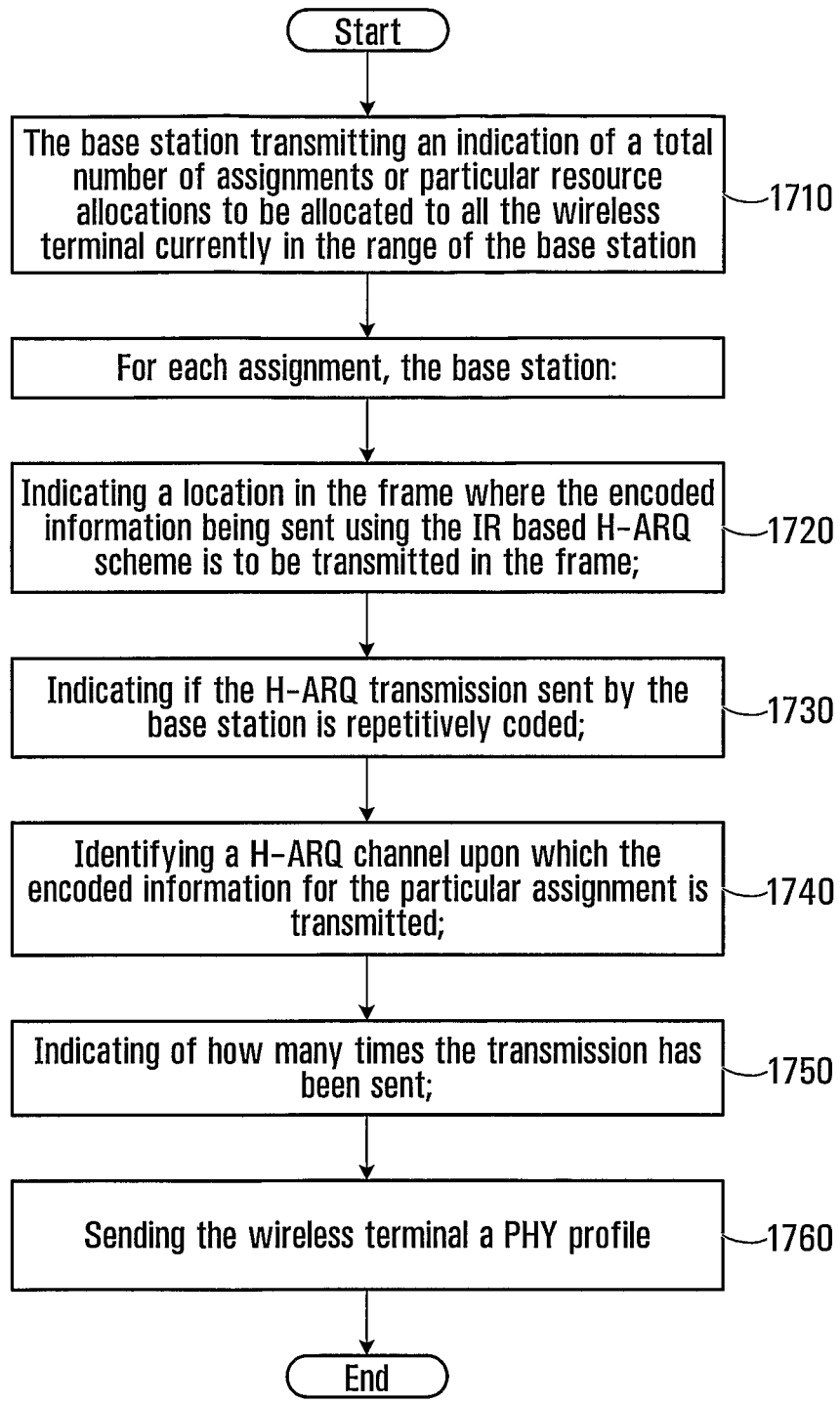
FIG. 11 is a flow chart for a method for a DL direction Chase based H-ARQ transmission scheme according to an embodiment of the invention.

Embodiments of the invention directed to a non-MIMO Chase based H-ARQ scheme will now be described based on FIG. 11. When utilizing non-MIMO Chase based H-ARQ, the base station sends to the wireless terminal an indication of a number of assignments to be performed at step 1710, then for each assignment the base station indicates to the wireless terminal the location in the frame of where the H-ARQ transmission is to be transmitted in the frame at 1720. As with the IR based H-ARQ schemes this may include such positional information as an OFDM symbol offset and subchannel offset from the start of the frame and information that indicates the size of the particular allocated assignment such as the number of OFDM symbols and number of subchannels. The base station may also send other information to the wireless terminal for each assignment, such as signal power information. The base station may send a repetition coding indication at step 1730 of a type described above. The base station sends the wireless terminal an identification of the channel used for the H-ARQ transmission for the particular assignment at step 1740. The base station also sends the wireless terminal an indication of how many times the transmission has been sent at step 1750, also know as the transmission count, for example if it is the first, second, third or additional transmission of the entire packet. In some embodiments, for each assignment the base station also sends the wireless terminal a PHY profile at step 1760, in the form of a DIUC and CID. There may also be additional padding bits in the transmission to provide an integer number of bytes in the base station transmission.

Figure 12:
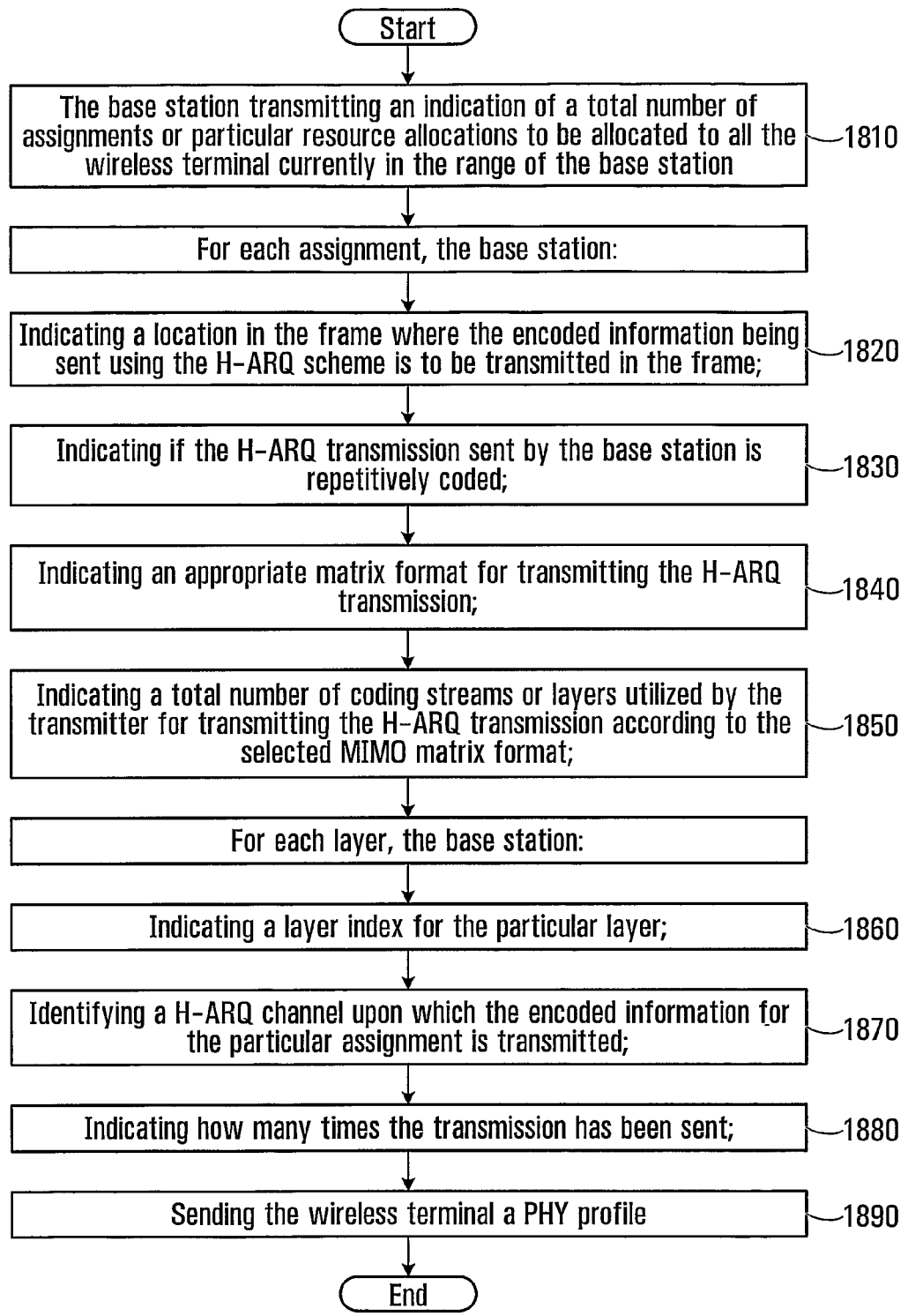
FIG. 12 is a flow chart for a method for another DL direction Chase based H-ARQ transmission scheme according to an embodiment of the invention.

Embodiments of the invention directed to a MIMO Chase based H-ARQ scheme will now be described based on FIG. 12. Utilizing MIMO Chase based H-ARQ includes many of the aspects utilized in non-MIMO Chase based H-ARQ with the addition of the base station identifying for each assignment a particular matrix format used for transmitting the H-ARQ transmission in an appropriate MIMO format in step 1840. The base station sends the wireless terminal an indication of a total number of coding streams or layers utilized by the transmitter for transmitting the H-ARQ transmission according to the selected MIMO matrix format at step 1850. For each of the layers the base station sends the wireless terminal a PHY profile, in the form of a DIUC and CID (step 1890), an indication of the layer index (step 1860), an indication of the H-ARQ channel identification (step 1870), and an indication of the transmission count (step 1880). There may also be additional padding bits in the transmission to provide an integer number of bytes in the base station transmission.

Figure 13:
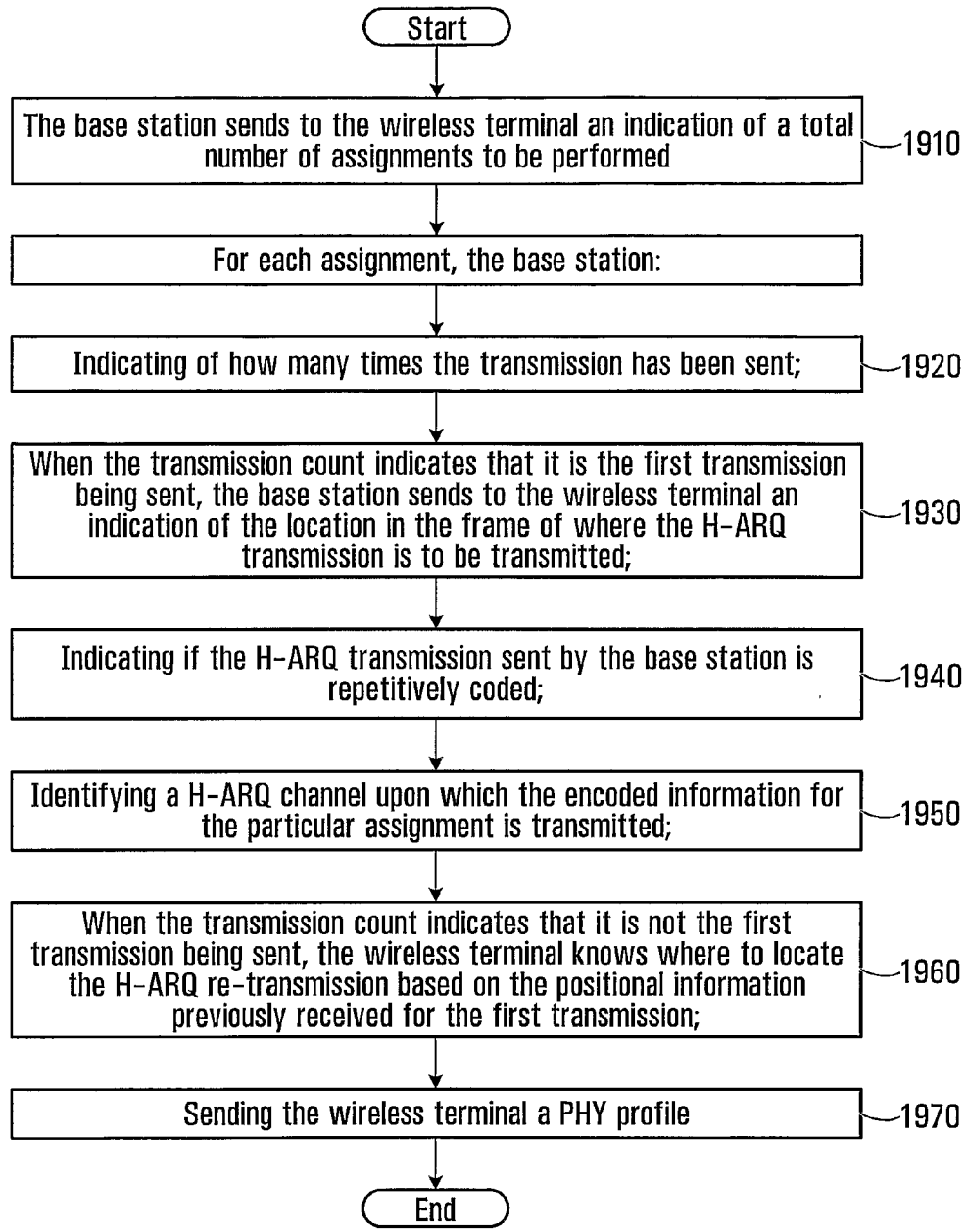
FIG. 13 is a flow chart for a method for a DL direction STC based H-ARQ transmission scheme according to an embodiment of the invention.

Embodiments of the invention directed to a STC based H-ARQ scheme will now be described based on FIG. 13. The STC based H-ARQ communications are used with MIMO enabled communications systems using STC mode. When utilizing STC based H-ARQ, the base station sends to the wireless terminal an indication of a total number of assignments to be performed at step 1910, then for each assignment the base station sends a transmission count at step 1920, which is an indication of how many times the transmission has be sent. When the transmission count indicates that it is the first transmission being sent, the base station sends to the wireless terminal an indication of the location in the frame of where the H-ARQ transmission is to be transmitted at step 1930. This may include such positional information as an OFDM symbol offset and subchannel offset from the start of the frame and information that indicates the size of the particular allocated assignment such as the number of OFDM symbols and number of subchannels. The base station may also send other information to the wireless terminal for each assignment, such as transmission signal power information. The base station may send a repetition coding indication at step 1940 as described above pertaining to IR and Chase based H-ARQ. The base station also sends the wireless terminal an identification of a H-ARQ channel at step 1950 upon which the encoded information for the particular assignment is transmitted. There may also be additional padding bits in the transmission to provide an integer number of bytes in the base station transmission. When the transmission count indicates that it is not the first transmission as shown at step 1960 the wireless terminal knows where to locate the H-ARQ re-transmission based on the positional information previously received for the first transmission so the positional information is not re-transmitted. In some embodiments for each assignment the base station also sends the wireless terminal a PHY profile at step 1970, in the form of a DIUC and CID.

In some embodiments of the invention, the base station sends the wireless terminal the information described above for MIMO or non-MIMO IR based H-ARQ and/or MIMO or non-MIMO Chase based H-ARQ and/or STC based H-ARQ in the form of an information element (IE) that could be transmitted by the base station in a portion of a data frame such as the down-link mapping component 212 of the data frame of FIG. 6. In some embodiments of MIMO or non-MIMO IR based H-ARQ and/or MIMO or non-MIMO Chase based H-ARQ as well as STC based H-ARQ, the base station may also send the wireless terminal an indication of the type of IE that the base station is sending, namely MIMO or non-MIMO IR based H-ARQ and/or MIMO or non-MIMO Chase based H-ARQ and/or STC based H-ARQ. This indication of the type of IE may be in the form of an Extended DIUC.

Tables 1-5 below are particular examples of formats for such IE.

IR_H-ARQ MAP IE

The following is an example of a format of a down-link IE that may be used in a down-link mapping component such as 212 of FIG. 6. This IE is transmitted by a base station to one or multiple wireless terminals that are running H-ARQ enabled connections and using IR mode.

TABLE 1

IR_H-ARQ MAP IE

| Syntax | Size (bits) | Note |
|---|---|---|
| IR_H-ARQ_IE( ) | | |
| Extended DIUC | 4 | IR_H-ARQ = 0x09 |
| Length | 4 | |
| Num_Assignments | 2 | |
| For | | |
| (i=0;i<Num_Assignments;i++) | | |
| { | | |
|   DIUC | 4 | |
|   CID | 16 | |
|   OFDMA Symbol offset | 8 | |
|   Subchannel offset | 6 | |
|   Boosting | 3 | |
|   No. of OFDMA symbols | 8 | |
|   No. of subchannels | 6 | |
|   Repetition coding indication | 2 | |
|   ACID | 3 | H-ARQ channel ID |
|   Packet_SN | 1 | Packet sequence number. When changed, it means a new packet is been transmitted |
|   SPID | 2 | Sub-packet ID |
| } | | |
| Padding bits | Variable | Padding bits to align boundary of byte |
| } | | |

The following is a brief description of each of the fields in Table 1. Many of the fields have been previously described in the general operation of the H-ARQ transmission.

An Extended DIUC is another grouping of code values. The "Extended DIUC" field is used to associate a code value to identify a particular type of IE. For example, the "IR_H-ARQ" IE in Table 1 has an "Extended DIUC"=09. Other IE described below may have different respective Extended DIUC values.

The "Length" field indicates the size of the IE. Therefore, if a receiver identifies that that the particular IE is not relevant to the receiver, it can advance to the next IE in the frame to see if it is relevant to the receiver, by advancing a value equal to the length field. In some embodiments for example, the "Length" field is the length of the IE as a number of bytes.

The "Num_Assignments" field indicates the number of assignments or allocations being made in the down-link portion of the frame for messages or information being transmitted from the base station to one or more wireless terminals.

The "For" loop is provided to supply description information for each assignment of the total number of assignments of the "Num_Assignments" field.

The "DIUC" field is set equal to a predefined value that indicates a type of transmission format, for example a coding scheme, used for transmitting data or messages in each assignment of the total number of assignments.

The "CID" field identifies a connection between a base station and a particular wireless terminal in each assignment of the total number of assignments.

The "OFDMA Symbol offset" and "Subchannel offset" fields indicate an initial starting point in the frame for each assignment of the total number of assignments. The "No. of OFDMA symbols" and "No. of subchannels" fields indicate how many of each symbols or subchannels, respectively are allotted to each assignment of the total number of assignments from the initial OFDMA Symbol offset and Subchannel offset starting points. The "Boosting" field is an indication of relative transmission signal power between pilot and data tones.

The "Repetition coding indication" field indicates a total number of times that the pre-coded version of the data or message to be sent in each assignment of the total number of assignments is encoded.

The "ACID", "Packet_SN", and "SPID" fields are used in combination to identify a particular component of data or message being transmitted in each assignment of the total number of assignments. The "ACID" field indicates the H-ARQ channel used to transmit the data or message. The "Packet_SN" filed indicates when a new packet is being transmitted and as described above may be a single bit that alternates each time a new bit is transmitted. The "SPID" field indicates a particular sub-packet identification so that the wireless terminal will know how the sub-packet is to be used in receiving and decoding the information, for example if the sub-packet is the first sub-packet containing the encoded data or a subsequent sub-packet containing information such as parity bits to aid in decoding the first sub-packet.

The values provided in Table 1 or subsequent tables below are mere examples of code values that could be used for the various fields and it is to be understood that the code values assigned and the number of bits used to represent the codes values could be varied according to a desired usage.

Chase_H-ARQ MAP IE

The following is an example of a format of a down-link IE that may be used in a down-link mapping component such as 212 of FIG. 6. This IE is transmitted by a base station to one or multiple wireless terminals that are running H-ARQ enabled connections and using Chase mode.

TABLE 2

Chase_H-ARQ MAP IE

| Syntax | Size (bits) | Note |
|---|---|---|
| Chase_H-ARQ_IE( ) | | |
| Extended DIUC | 4 | |
| Length | 4 | |
| Num_Assignments | 2 | |
| For | | |
| (i=0;i<Num_Assignments;i++) | | |
| { | | |
|   DIUC | 4 | |
|   CID | 16 | |
|   OFDMA Symbol offset | 8 | |
|   Subchannel offset | 6 | |
|   Boosting | 3 | |
|   No. of OFDMA symbols | 8 | |
|   No. of subchannels | 6 | |
|   Repetition coding indication | 2 | |
|   ACID | 3 | H-ARQ channel ID |
|   Tx_Count | 2 | Transmission count: 00: first transmission 01: second transmission 10: third transmission 11: fourth transmission |
| } | | |
| Padding bits | Variable | Padding bits to align boundary of byte |
| } | | |

The fields of the "Chase_H-ARQ MAP" IE are essentially the same as the "IR_H-ARQ MAP IE", with the exception that the "Packet_SN" and "SPID" fields of the IR based IE are replaced with a "Tx_Count" field. The "Tx_Count" field indicates which particular transmission of encoded data is being transmitted in each assignment of the total number of assignments. As described above, with Chase based H-ARQ the entire transmission is re-transmitted each time a NAK is received. The "Tx_Count" field allows the wireless receiver to keep track of which transmission it is receiving.

MIMO_IR_H-ARQ MAP IE

The following is an example of a format of a down-link IE that may be used in a down-link mapping component such as 212 of FIG. 6. This IE is transmitted by a base station to one or multiple MIMO-capable wireless terminals that are running H-ARQ enabled connections and using IR mode.

TABLE 3

MIMO_IR_H-ARQ MAP IE

| Syntax | Size (bits) | Note |
|---|---|---|
| MIMO_IR_H-ARQ_IE( ) | | |
| Extended DIUC | 4 | |
| Length | 4 | |
| Num_Assignments | 2 | |
| For (i=0;i<Num_Assignments;i++) | | |
| { | | |
|   OFDMA Symbol offset | 8 | |
|   Subchannel offset | 6 | |
|   Boosting | 3 | |
|   No. of OFDMA symbols | 8 | |
|   No. of subchannels | 6 | |
|   Repetition coding indication | 2 | |
|   Matrix_indicator | 2 | |
|   Num_Layer | 2 | |
|   For i=0;i<Num_Layers;i++) | | |
|   { | | |
|     CID | 16 | |
|     DIUC | 4 | |
|     Layer_index | 2 | |
|     ACID | 3 | H-ARQ channel ID |
|     Packet_SN | 1 | Packet sequence number. When changed, it means a new packet is been transmitted |
|     SPID | 2 | Sub-packet ID |
|   } | | |
| } | | |
| Padding bits | Variable | Padding bits to align boundary of byte |
| } | | |

The fields of the "MIMO_IR_H-ARQ MAP" IE are essentially the same as those found in the "IR_H-ARQ MAP" IE except that a "Matrix_indicator" field indicates for each assignment of the total number of assignments a type of matrix that is used for transmitting data or messages in each assignment. Also, for each assignment, a total number of layers or streams of transmission for each assignment are indicated by the "Num_Layer" field. Subsequently, a second "For" loop is used for indicating to the wireless terminal information about each layer of the total number of layers. Specifically, the "CID" and "DIUC" fields serve the same purpose as the "IR_H-ARQ MAP" IE. In addition to the "ACID", "Packet_SN", and "SPID" fields in the "IR_H-ARQ MAP" IE, the "MIMO_IR_H-ARQ MAP" IE also has a "Layer_index" field indicating to which layer of the total number of layers the "ACID", "Packet_SN", and "SPID" fields pertain.

MIMO_Chase_H-ARQ MAP IE

The following is an example of a format of a down-link IE that may be used in a down-link mapping component such as 212 of FIG. 6. This IE is transmitted by a base station to one or multiple MIMO-capable wireless terminals that are running H-ARQ enabled connections and using Chase mode.

TABLE 4

MIMO_Chase_H-ARQ MAP IE

| Syntax | Size (bits) | Note |
|---|---|---|
| MIMO_Chase_H-ARQ_IE( ) | | |
| Extended DIUC | 4 | |
| Length | 4 | |
| Num_Assignments | 2 | |
| For (i=0;i<Num_Assignments;i++) | | |
| { | | |
|   OFDMA Symbol offset | 8 | |
|   Subchannel offset | 6 | |
|   Boosting | 3 | |
|   No. of OFDMA symbols | 8 | |
|   No. of subchannels | 6 | |
|   Repetition coding indication | 2 | |
|   Matrix_indicator | 2 | |
|   Num_Layer | 2 | |
|   For i=0;i<Num_Layers;i++) | | |
|   { | | |
|     CID | 16 | |
|     DIUC | 4 | |
|     Layer_index | 2 | |
|     ACID | 3 | H-ARQ channel ID |
|     Tx_Count | 2 | Transmission count: 00: first transmission 01: second transmission 10: third transmission 11: fourth transmission |
|   } | | |
| } | | |
| Padding bits | Variable | Padding bits to align boundary of byte |
| } | | |

The fields of the "MIMO_Chase_H-ARQ MAP" IE are essentially the same as those found in the "Chase_H-ARQ MAP" IE except that a "Matrix_indicator" field indicates for each assignment of the total number of assignments a type of matrix that is used for transmitting data or messages in each assignment. Also, for each assignment, a total number of layers or streams of transmission for each assignment are indicated by the "Num_Layer" field, similar to that of the "MIMO_IR_H-ARQ MAP" IE. Subsequently, a second "For" loop is used for indicating to the wireless terminal information about each layer of the total number of layers. Specifically, the "CID" and "DIUC" fields serve the same purpose as the "IR_H-ARQ MAP" IE. In addition to the "Tx_Count" field in the "Chase_H-ARQ MAP" IE, the "MIMO_Chase_H-ARQ MAP" IE also has a "Layer_index" field indicating to which layer of the total number of layers the "Tx_Count" field pertains.

STC_H-ARQ MAP IE

The following is an example of a format of a down-link IE that may be used in a down-link mapping component such as 212 of FIG. 6. This IE is transmitted by a base station to one or multiple MIMO-capable wireless terminals that are running H-ARQ enabled connections and using STC mode. The re-transmission matrix used depends on a number of base station transmission antennas. Examples of re-transmission matrices used are found in Section 8.4.8.9 of IEEE standard P802.16e/D9 (June 2005), which is hereby incorporated in its entirety.

TABLE 5

STC_H-ARQ MAP IE

| Syntax | Size (bits) | Note |
|---|---|---|
| STC_H-ARQ_IE( ) | | |
| Extended DIUC | 4 | |
| Length | 4 | |
| Num_Assignments | 2 | |
| For (i=0;i<Num_Assignments;i++) { | | |
|   DIUC | 4 | |
|   CID | 16 | |
|   Tx_Count | 2 | Transmission count: 00: first transmission 01: second transmission 10: third transmission 11: fourth transmission |
|   If (Tx_Count == 00) { | | |
|     OFDMA Symbol offset | 8 | |
|     Subchannel offset | 6 | |
|     Boosting | 3 | |
|     No. of OFDMA symbols | 8 | |
|     No. of subchannels | 6 | |
|     Repetition coding indication | 2 | |
|   } | | |
|   ACID | 3 | H-ARQ channel ID |
| } | | |
| Padding bits | Variable | Padding bits to align boundary of byte |
| } | | |

The fields of the "STC_H-ARQ MAP/" IE have many fields in common with the "IR_H-ARQ MAP" IE and the "Chase_H-ARQ MAP" IE.

After initiating a first "For" loop performed for each assignment of a total number of assignments, in which "DUIC" and "CID" fields are provided, a "Tx_Count" field is included in the IE which acts similar to the same named field in the "Chase_H-ARQ MAP". An "If" condition in the IE indicates the starting point, size of the assignment, boosting information and repetition coding information if the "If" condition is true, that is for a first transmission.

An "ACID" field indicates the H-ARQ channel, similar to the other IR and Chase IEs above for each assignment of the total number of assignments.

H-ARQ Transmissions in the Up-Link Direction

Figure 14:
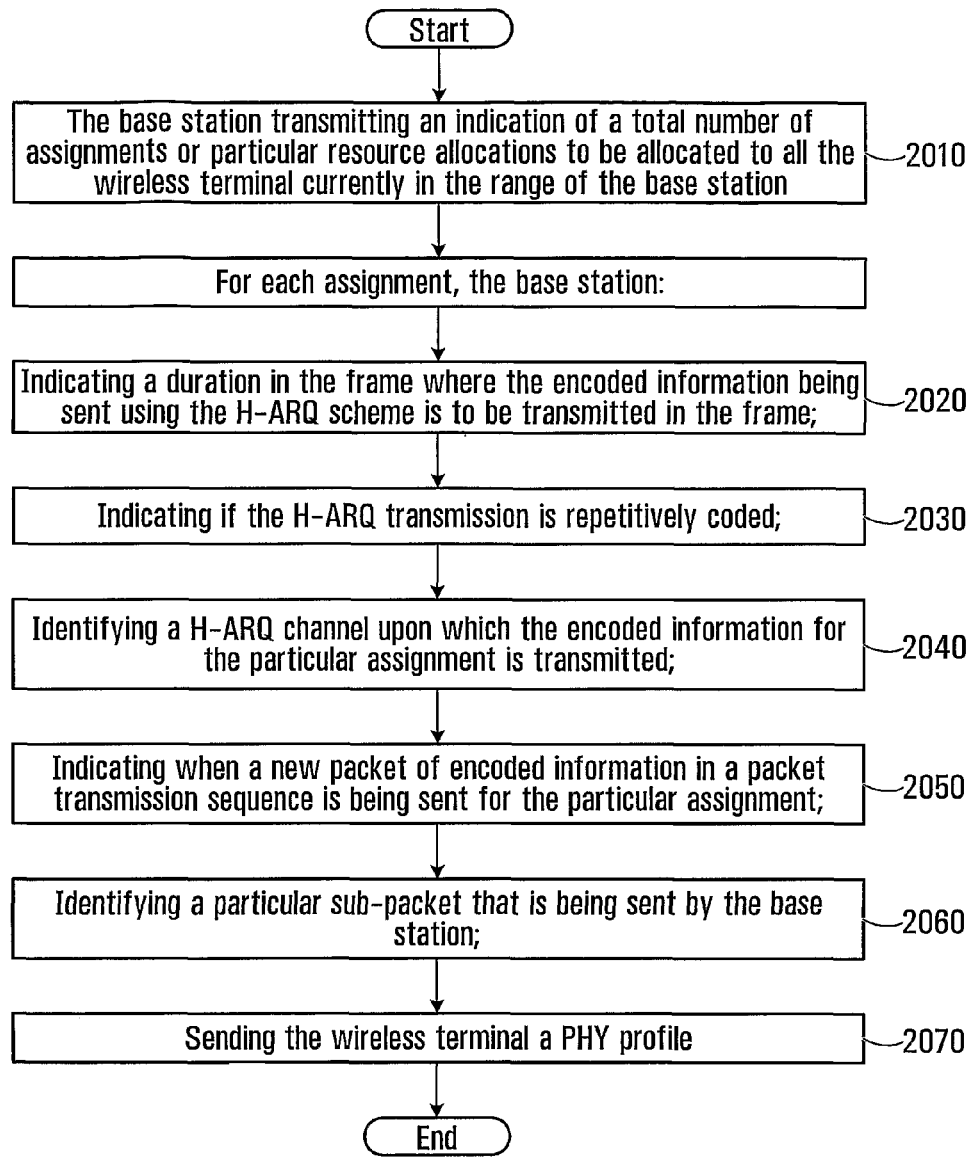
FIG. 14 is a flow chart for a method for an up-link (UL) direction IR based H-ARQ transmission scheme according to an embodiment of the invention.

Embodiments of the invention directed to a non-MIMO IR based H-ARQ scheme will now be described based on FIG. 14. The base station sends to the wireless terminal an indication of a total number of assignments to be performed at step 2010, then for each assignment the base station indicates to the wireless terminal the duration of the assignment in the frame where the H-ARQ transmission is to be transmitted in the frame at step 2020. The base station sends a repetition coding indication of a type described above for down-link IR based H-ARQ at step 2030. The base station sends the wireless terminal an identification of a H-ARQ channel upon which the encoded information for the particular assignment is transmitted at step 2040. The base station also sends the wireless terminal an indication of when a new packet in a packet transmission sequence is being sent for the particular assignment at step 2050. In some embodiments, for example this indication may simply entail a single bit that is alternated between 0 and 1 each time a new packet is transmitted. For each assignment the base station also sends an identification of the particular sub-packet that is being sent by the base station at step 2060, for example the first, second or third sub-packet as described above for down-link base H-ARQ. In some embodiments, for each assignment the base station also sends the wireless terminal a PHY profile at step 2070, in the form of an up-link interval usage code (UIUC) and CID. There may also be additional padding bits in the transmission to provide an integer number of bytes in the base station transmission.

Figure 15:
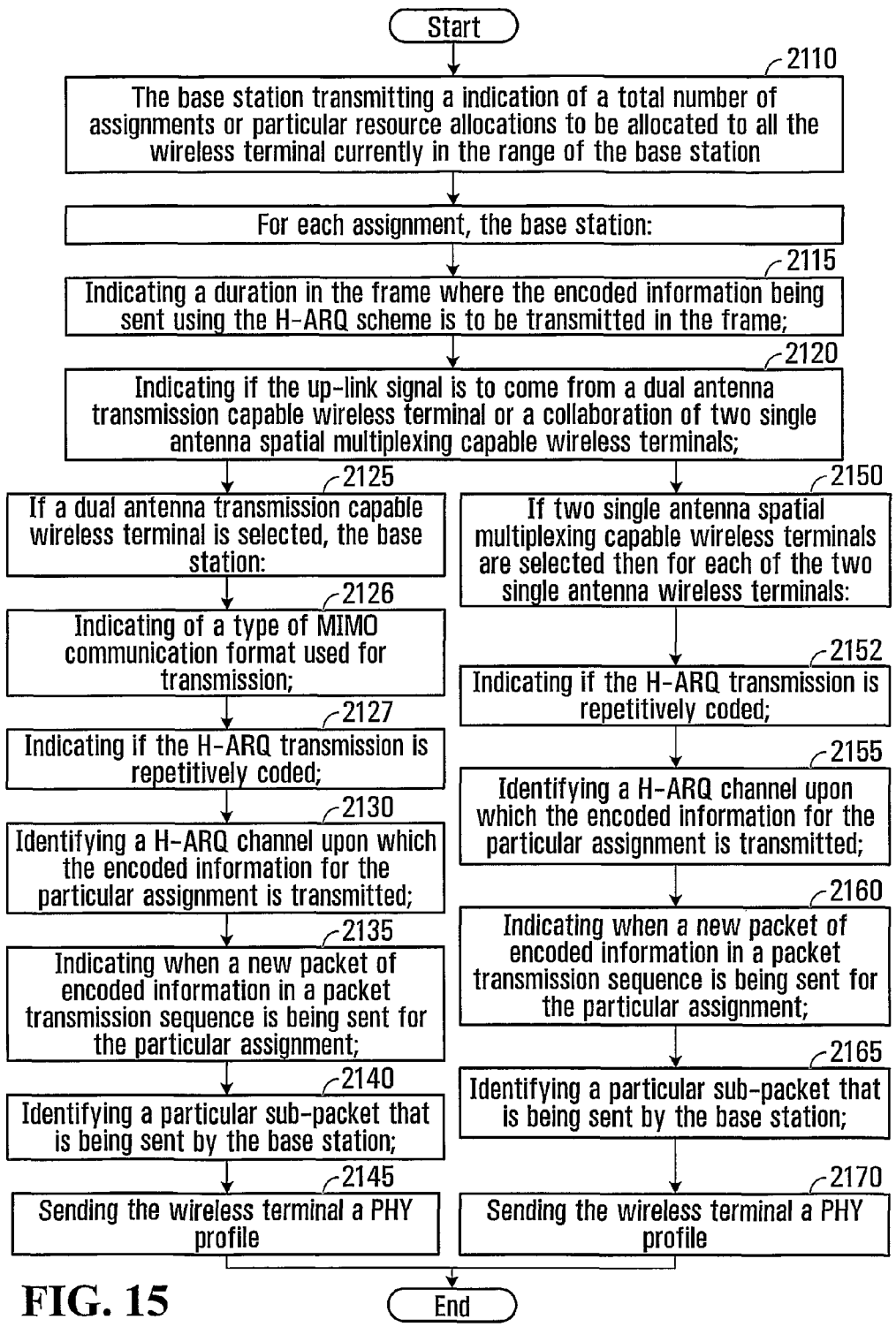
FIG. 15 is a flow chart for a method for another UL direction IR based H-ARQ transmission scheme according to an embodiment of the invention.

Embodiments of the invention directed to a MIMO IR based H-ARQ scheme will now be described based on FIG. 15. When utilizing MIMO IR based H-ARQ, the base station sends to the wireless terminal an indication of a total number of assignments to be performed at step 2110, then for each assignment the base station indicates to the wireless terminal the duration of the assignment in the frame where the H-ARQ transmission is to be transmitted in the frame at step 2115. For each assignment the base station sends an indication if the up-link signal is to come from a dual antenna transmission capable wireless terminal or a collaboration of two single antenna spatial multiplexing (SM) capable wireless terminals at step 2120. If a dual antenna transmission capable wireless terminal is selected as indicated at step 2125, then the base station sends an indication of whether MIMO communication is performed using space-time transmit diversity (STTD) or spatial multiplexing (SM) at step 2126. Following this indication the base station sends a repetition coding indication at step 2127. The base station also sends the wireless terminal an identification of a H-ARQ channel upon which the encoded information for the particular assignment is transmitted at step 2130. The base station also sends the wireless terminal an indication of when a new packet in a packet transmission sequence is being sent for the particular assignment at step 2135. In some embodiments, this indication may simply entail a single bit that is alternated between 0 and 1 each time a new packet is transmitted. For each assignment the base station also sends an identification of the particular sub-packet that is being sent by the base station at step 2140, for example the first, second or third sub-packet as described above. As well, the base station identifies the PHY profile at step 2145 including the UIUC and the CID of the transmission.

If two single antenna spatial multiplexing capable wireless terminals are selected as indicated at 2150 then the base station sends the PHY profile (step 2170), the repetition coding indication (step 2152), the H-ARQ channel identification (step 2155), the packet sequence number (step 2160) and the sub-packet ID (step 2165) for each of the two wireless terminals. The two wireless terminals use different pilot patterns during transmission to differentiate between the two wireless terminals.

Figure 16:
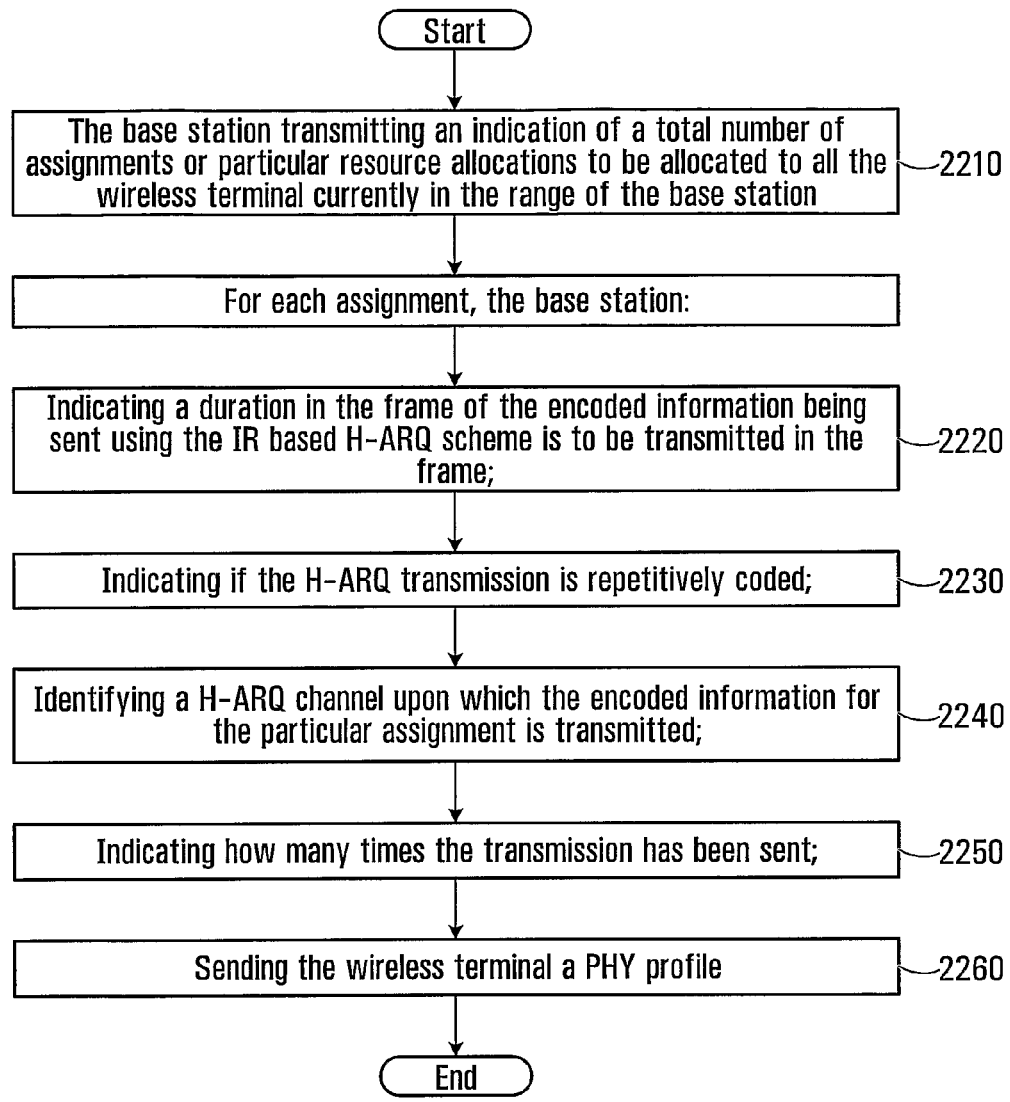
FIG. 16 is a flow chart for a method for a UL direction Chase based H-ARQ transmission scheme according to an embodiment of the invention.

Embodiments of the invention directed to a non-MIMO Chase based H-ARQ scheme will now be described based on FIG. 16. When utilizing non-MIMO Chase based H-ARQ, the base station sends to the wireless terminal an indication of a total number of assignments to be performed at step 2210, then for each assignment the base station indicates to the wireless terminal the duration of the assignment in the frame where the H-ARQ transmission is to be transmitted in the frame at step 2220. The base station sends a repetition coding indication at step 2230 of a type described above. The base station also sends the wireless terminal an identification of a H-ARQ channel upon which the encoded information for the particular assignment is transmitted at step 2240. The base station also sends the wireless terminal a transmission count at step 2250, which is an indication of how many times the transmission has been sent. In some embodiments for each assignment the base station also sends the wireless terminal a PHY profile at step 2260, in the form of the UIUC and CID.

There may also be additional padding bits in the transmission to provide an integer number of bytes in the base station transmission.

Figure 17:
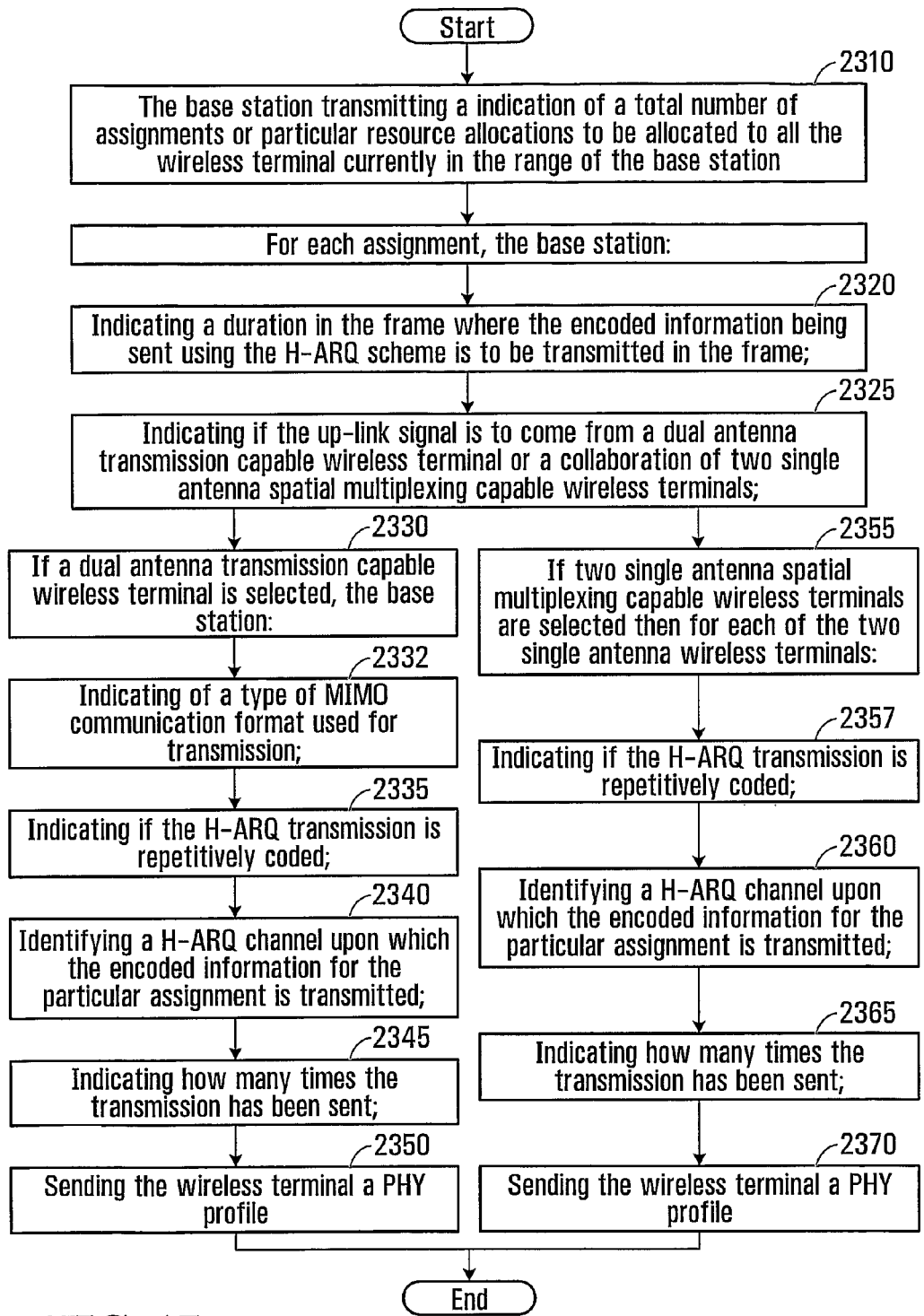
FIG. 17 is a flow chart for a method for another UL direction Chase based H-ARQ transmission scheme according to an embodiment of the invention.

Embodiments of the invention directed to a MIMO Chase based H-ARQ scheme will now be described based on FIG. 17. For MIMO Chase based H-ARQ, the base station sends to the wireless terminal an indication of a total number of assignments to be performed at step 2310, then for each assignment the base station indicates to the wireless terminal the duration of the assignment in the frame where the H-ARQ transmission is to be transmitted in the frame at step 2320. For each assignment the base station sends an indication that the up-link signal is to come from a dual antenna transmission capable wireless terminal or a collaboration of two single antenna spatial multiplexing capable wireless terminals at step 2325. If a dual antenna transmission capable wireless terminal is selected as of step 2330 then the base station sends an indication of whether MIMO communication is performed using STTD or SM at step 2332. Following this indication the base station sends a repetition coding indication at step 2335. The base station sends the wireless terminal the PHY profile at step 2350, including the UIUC and CID and a channel ID used for the H-ARQ transmission for the particular assignment at step 2340. The base station also sends the wireless terminal the transmission count at step 2345.

If two single antenna spatial multiplexing capable wireless terminals are selected at step 2355 then the base station sends the PHY profile (step 2370), including the UIUC and CID, the repetition coding indication at step 2357, the H-ARQ channel identification (step 2360), and the indication of the transmission count (step 2365) for each of the two wireless terminals. The two wireless terminals use different pilot patterns during transmission to differentiate between the two wireless terminals.

The STC based H-ARQ communications are used with MIMO enabled communications systems using STC mode. For up-link STC based H-ARQ, the format used for sending information to the wireless terminal is essentially the same as that for down-link STC based H-ARQ described above in FIG. 13, except that an indication of the location in the frame of where the H-ARQ transmission is to be transmitted is replaced with a duration of the H-ARQ transmission.

In some embodiments of the invention, the base station sends the wireless terminal the information described above for MIMO or non-MIMO IR based H-ARQ and/or MIMO or non-MIMO Chase based H-ARQ and/or STC based H-ARQ in the form of an IE that could be transmitted by the base station in a portion of a data frame such as the up-link mapping component 214 of the data frame of FIG. 6. Tables 6-10 below are particular examples of formats for such IE.

In some embodiments of MIMO or non-MIMO IR based H-ARQ and/or MIMO or non-MIMO Chase based H-ARQ as well as STC based H-ARQ, the base station may also send the wireless terminal an indication of the type of IE that the base station is sending, namely MIMO or non-MIMO IR based H-ARQ and/or MIMO or non-MIMO Chase based H-ARQ and/or STC based H-ARQ. This indication of the type of IE may be in the form of an Extended UIUC.

IR_H-ARQ MAP IE

The following is an example of a format of an up-link IE that may be used in an up-link mapping component such as 214 of FIG. 6. This IE is transmitted by a base station to one or multiple wireless terminals that are running H-ARQ enabled connections and using IR mode.

TABLE 6

IR_H-ARQ MAP IE

| Syntax | Size (bits) | Note |
|---|---|---|
| IR_H-ARQ_IE( ) | | |
| Extended UIUC | 4 | IR H-ARQ = 0x09 |
| Length | 4 | |
| Num_Assignments | 2 | |
| For | | |
| (i=0;i<Num_Assignments;i++) | | |
| { | | |
| UIUC | 4 | |
| CID | 16 | |
| Duration | 10 | |
| Repetition coding indication | 2 | |
| ACID | 3 | H-ARQ channel ID |
| Packet_SN | 1 | Packet sequence number. When changed, it means a new packet is been transmitted |
| SPID | 2 | Sub-packet ID |
| } | | |
| Padding bits | Variable | Padding bits to align boundary of byte |
| } | | |

Most of the fields of the up-link "IR_H-ARQ MAP" IE have been previously above with respect to the down-link "IR_H-ARQ MAP" IE.

Instead of having the Extended DUIC, the up-link IEs have an Extended UIUC (up-link interval usage code). The "Extended UIUC" field is used to associate a code value to identify a particular type of IE. For example, the "IR_H-ARQ" IE in Table 6 has an "Extended UIUC"=09. Other IE described below are indicated to have different respective Extended UIUC values. The values provided in Table 6 or subsequent tables below are mere examples of code values that could be used and it is to be understood that the code values assigned, and the number of bits used to represent the codes values could be varied according to a desired usage.

In a UL mapping, a MIMO-enabled base station transmits an UIUC equal to a predefined value, to indicate a type of transmission format, for example a coding scheme of the subsequent up-link allocation to a specific wireless terminal CID for each assignment of a total number of assignments.

Instead of the positional information needed in the down-link IEs, such as "OFDMA Symbol offset", "Subchannel offset", "No. of OFDMA symbols", "No. of subchannels" and "Boosting" fields, the "IR_H-ARQ MAP" IE indicates the size of the assignment by a "Duration" field. As the up-link sub-frame includes a series of essentially concatenated slots, only the duration or length of the slot is used for each assignment of the total number of assignments.

Chase_H-ARQ MAP IE

The following is an example of a format of an up-link IE that may be used in an up-link mapping component such as 214 of FIG. 6. This IE is transmitted by a base station to one or multiple wireless terminals that are running H-ARQ enabled connections and using Chase mode.

TABLE 7

Chase_H-ARQ MAP IE

| Syntax | Size (bits) | Note |
|---|---|---|
| Chase_H-ARQ_IE( ) | | |
| Extended UIUC | 4 | |
| Length | 4 | |

TABLE 7-continued

Chase_H-ARQ MAP IE

| Syntax | Size (bits) | Note |
|---|---|---|
| Num_Assignments | 2 | |
| For (i=0;i<Num_Assignments;i++) { | | |
|   UIUC | 4 | |
|   CID | 16 | |
|   Duration | 6 | |
|   Repetition coding indication | 2 | |
|   ACID | 3 | H-ARQ channel ID |
|   Tx_Count | 2 | Transmission count: 00: first transmission 01: second transmission 10: third transmission 11: fourth transmission |
| } | | |
| Padding bits | Variable | Padding bits to align boundary of byte |
| } | | |

The up-link "Chase_H-ARQ MAP" IE is essentially the same as the up-link "IR_H-ARQ MAP" IE, except for replacing the "Packet_SN" and "SPID" fields with the "Tx_Count" field.

Similar to the up-link "IR_H-ARQ MAP" IE, the positional information of the "Chase_H-ARQ MAP" IE is replaced with a "Duration" field.

MIMO_IR_H-ARQ MAP IE

The following is an example of a format of an up-link IE that may be used in an up-link mapping component such as 214 of FIG. 6. This IE is transmitted by a base station to one or multiple MIMO-capable wireless terminals that are running H-ARQ enabled connections and using IR mode.

TABLE 8

MIMO_IR_H-ARQ MAP IE

| Syntax | Size (bits) | Note |
|---|---|---|
| MIMO_IR_H-ARQ_IE( ) | | |
| Extended UIUC | 4 | |
| Length | 4 | |
| Num_Assignments | 2 | |
| For i=0;i<Num_Assignments;i++) { | | |
|   Duration | 10 | |
|   Collaborative SM_Indication | 1 | 0: Non collaborative SM (assignment to a dual transmission capable wireless terminal) 1: Collaborative SM (assignment to 2 collaborative SM capable wireless terminals) |
|   If (Collaborative SM_Indication == 0) { | | |
|     MIMO_Control | 1 | 0: STTD 1: SM |
|     CID | 16 | Connection ID |
|     UIUC | 4 | |
|     Repetition coding indication | 2 | |
|     ACID | 3 | H-ARQ channel ID |
|     Packet_SN | 1 | Packet sequence number. When changed, it means a new packet is been transmitted |
|     SPID | 2 | Sub-packet ID |
|   } else { | | |
|     CID | 16 | Connection ID. This wireless terminal shall use pilot pattern A |
|     UIUC | 4 | |
|     Repetition coding indication | 2 | |
|     ACID | 3 | H-ARQ channel ID |
|     Packet_SN | 1 | Packet ID-packet sequence number. When changed, it means a new packet is been transmitted |
|     SPID | 2 | Sub-packet ID |
|     CID | 16 | Connection ID. This wireless terminal shall use pilot pattern B |
|     UIUC | 4 | |
|     ACID | 3 | H-ARQ channel ID |
|     Packet_SN | 1 | Packet sequence number. When changed, it means a new packet is been transmitted |
|     SPID | 2 | Sub-packet ID |
|   } | | |
| Padding bits | Variable | Padding bits to align boundary of byte |
| } | | |

In the "MIMO_IR_H-ARQ MAP" IE after a "For" loop for each assignment of the total number of assignments a "Duration" field indicates the size of an assigned slot of the up-link sub-frame of the frame.

A "Collaborative SM_Indication" field indicates whether a single dual transmission capable wireless terminal is to transmit information back to the base station or in each assignment or two collaborative spatial multiplexing (SM) capable wireless terminals are each transmitting information back to the base station.

An "If . . . else" condition is used for the IE to provide particulars for each of the two possible configurations. If a single dual transmission capable wireless terminal is used, a "MIMO_Control" field indicates a type of transmission diversity to be used by the single wireless terminal, for example STTD or SM. The remainder of the first portion of the "If . . . else" condition contains fields similar to the previously described IEs.

If two collaborative wireless terminals are used, for each of the two wireless terminals the IE uses the "CID", "UIUC", "ACID", "Packet_SN" and "SPID" fields that are similar to the other previously described IEs. However, in this case the "CID" of the first wireless terminal of the two wireless terminals uses a first pilot pattern and the second wireless terminal of the two wireless terminals uses a second pilot pattern.

MIMO_CHASE_H-ARQ MAP IE

The following is an example of a format of an up-link IE that may be used in an up-link mapping component such as 214 of FIG. 6. This IE is transmitted by a base station to one or multiple MIMO-capable wireless terminal that are running H-ARQ enabled connections and using Chase mode.

TABLE 9

MIMO_Chase_H-ARQ MAP IE

| Syntax | Size (bits) | Note |
|---|---|---|
| MIMO_Chase_H-ARQ_IE( ) | | |
| Extended UIUC | 4 | |
| Length | 4 | |
| Num_Assignments | 2 | |
| For (i=0;i<Num_Assignments;i++) { | | |
| Duration | 10 | |
| Collaborative SM_Indication | 1 | 0: Non collaborative SM (assignment to a dual transmission capable wireless terminal) 1: Collaborative SM (assignment to 2 collaborative SM capable wireless terminals) |
| If (Collaborative SM_Indication == 0) { | | |
| MIMO_Control | 1 | 0: STTD 1: SM |
| CID | 16 | Connection ID |
| UIUC | 4 | |
| Repetition coding indication | 2 | |
| ACID | 3 | H-ARQ channel ID |
| Tx_Count | 2 | Transmission count: 00: first transmission 01: second transmission 10: third transmission 11: fourth transmission |
| } else { | | |
| CID | 16 | Connection ID. This wireless terminal shall use pilot pattern A |
| UIUC | 4 | |
| Repetition coding indication | 2 | |
| ACID | 3 | H-ARQ channel ID |
| Tx_Count | 2 | Transmission count: 00: first transmission 01: second transmission 10: third transmission 11: fourth transmission |
| CID | 16 | Connection ID. This wireless terminal shall use pilot pattern B |
| UIUC | 4 | |
| Repetition coding indication | 2 | |
| ACID | 3 | H-ARQ channel ID |
| Tx_Count | 2 | Transmission count: 00: first transmission 01: second transmission 10: third transmission 11: fourth transmission |

TABLE 9-continued

MIMO_Chase_H-ARQ MAP IE

| Syntax | Size (bits) | Note |
|---|---|---|
| | | 11: fourth transmission |
| } | | |
| Padding bits | Variable | Padding bits to align boundary of byte |
| } | | |

The fields of the up-link "MIMO_Chase_H-ARQ MAP" IE are essentially the same as the "MIMO_IR_H-ARQ MAP IE", the exception that the "Packet_SN" and "SPID" fields of the IR based IE are replaced with the "Tx_Count" field.

STC_H-ARQ MAP IE

The following is an example of a format of an up-link of FIG. 6. This IE is transmitted by a base station to one or multiple dual-transmission capable wireless terminals that are running H-ARQ enabled connections and using STC mode. Examples of re-transmission matrices used are found in Section 8.4.8.9 of IEEE standard P802.16e/D9 (June 2005).

TABLE 10

STC_H-ARQ MAP IE

| Syntax | Size (bits) | Note |
|---|---|---|
| STC_H-ARQ_IE( ) | | |
| Extended UIUC | 4 | |
| Length | 4 | |
| Num_Assignments | 2 | |
| For (i=0;i<Num_Assignments;i++) { | | |
| UIUC | 4 | |
| CID | 16 | |
| Tx_Count | 2 | Transmission count: 00: first transmission 01: second transmission 10: third transmission 11: fourth transmission |
| If (Tx_Count == 00) { | | |
| Duration | 10 | |
| Boosting | 3 | |
| Repetition coding indication | 2 | |
| } | | |
| ACID | 3 | H-ARQ channel ID |
| } | | |
| Padding bits | Variable | Padding bits to align boundary of byte |
| } | | |

For up-link STC based H-ARQ the format of the IE is the same as that for down-link STC based H-ARQ described above.

The values in the "Size" column of Tables 1-10 refer to a number of bits used to represent the element of each respective field. It is to be understood that these values are but one example for each respective field. In some embodiments, the number of bits can be greater or less than what is represented in Tables 1-10. For example, the number of bits in any of the fields may be desired to be less than the values represented above to reduce an overall IE size, and therefore reduce an overall overhead of the frame. Conversely, the number of bits in any of the fields may be greater than the values represented above at an acceptable cost of increasing the overall overhead of the frame.

Resource Management Protection

As described above, the IEEE 802.16(e) draft version of standard has no viable format for protecting resources from being abused by a malicious wireless terminal who is not registered with the network, but can none-the-less request transmission resources from the base station. FIG. 18 shows a data frame, generally indicated at 900, similar to the data frame of FIG. 6, but not showing all the same components as FIG. 6. A down-link mapping component (DL MAP) 912 includes mapping IEs 913A and 913B. An up-link mapping component (UL MAP) 914 includes mapping IEs 915A and 915B. The data frame 900 also includes a down-link subframe 917 containing down-link regions 918 allocated for transmissions from the base station to the wireless terminal and an up-link subframe 919 containing up-link slots 920,921 allocated for transmissions from the wireless terminal to the base station. Up-link mapping IE 915A acts as a pointer to a first slot 920 of the up-link subframe 919 allocated for the wireless terminal to request initial access to the network. Up-link mapping IE 915B acts as a pointer to a second slot 921 of the up-link subframe 919 allocated for the wireless terminal to request additional up-link transmission resources, such as a BW request.

FIG. 19 shows a data frame, generally indicated at 1000, similar to that of FIG. 18 with an improvement to aid in protecting the transmission resources allocated by the base station. A down-link mapping component (DL MAP) 1012 includes non-encrypted mapping IEs 1013A,1013B,1013C. A first up-link mapping component (UL MAP) 1014 includes non-encrypted mapping IEs 1015A,1015B. A second UL MAP 1010 includes encrypted mapping IEs 1011A,1011B. Similar to FIG. 18, the data frame 1000 of FIG. 19 has a down-link subframe 1017 having regions 1018 and an up-link subframe 1019 having regions or slots 1020,1021. The DL MAP 1012 is used as a root MAP for a purpose of initial network access. In some embodiments, the non-encrypted mapping IEs 1013A,1013B,1013C of the root MAP, DL MAP 1012, act as pointers to another DL MAP or to an UL MAP. The another DL MAP may be an encrypted DL MAP or an non-encrypted DL MAP. Similarly, the UL MAP may be non-encrypted or encrypted, such as UL MAPs 1014 or 1010, respectively. In some embodiments, one or more of non-encrypted mapping IEs 1013A,1013B,1013C of the root MAP, DL MAP 1012, act as a pointer to a DL region, such as DL region 1018 in DL subframe 1017 or UL slots 1020,1021 in the UL subframe 1019. In some embodiments, one or more of non-encrypted mapping IEs 1013A,1013B,1013C of the root MAP 1012 act as a pointer to IEs 1015A,1015B in the first UL MAP 1014. IEs 1015A,1015B of the first UL MAP 1014 may then act as pointers to the DL region, such as DL region 1018 in DL subframe 1017 or the UL slot, such as UL slot 1020,1021 in the UL subframe 1019. In some embodiments, one or more of non-encrypted mapping IEs 1013A, 1013B,1013C of the root MAP 1012 act as a pointer to IEs 1011A,1011B in the second UL MAP 1010. IEs 1011A, 1011B of the second UL MAP 1010 may then act as pointers to the DL region, such as DL region 1018 in DL subframe 1017 or the UL slot in the UL subframe 1019. In addition to being used for transmission of data from the base station to the wireless terminals, the DL regions 1018 are used for providing system configuration information such as DL or UL channel description. Similarly, the UL slots 1020,1021 may be used for initial ranging for aiding in initial network access and/or for indicating DL or UL resource allocation in addition to transmitting general information from the wireless terminal to the base station.

The DL MAP 1012 acting as the root MAP includes non-encrypted information that any wireless terminal can understand without having pre-acquired an encryption key. Encrypted information, for example in second UL MAP 1010 is understandable only by wireless terminals authenticated by the base station to be registered with the network.

As described with relation to FIG. 6, the illustrated frame structure of FIG. 19 is a specific example. The frame components such as the DL MAP and UL MAPs, DL subframe and UL subframe, as well as those not shown such as the preamble, may be implemented using an implementation specific number of OFDM symbols, with implementation specific guard bands. The number and definition of OFDM subchannels is also an implementation detail. The layout sequence of the various fields can also be varied.

A public access Traffic Encryption Key (TEK) for enabling encrypting the DL/UL MAPs is transmitted by the base station to the wireless terminals registered with the network at an authentication/authorization stage of initial network entry. The public access TEK is known to the base station and any wireless terminals authenticated to be registered with the network. Wireless terminals that are not authenticated as being registered with the network, do not receive the public access TEK and as a result can not decrypt the messages indicating the location in the frame allocated for requesting additional UL resources. In some embodiments, the public access key is periodically updated.

In some embodiments, the renewal and delivery of the public access key is similar to that currently defined for MBS (multicast/broadcast service). However, other techniques that are different than MBS are considered to be within the scope of the invention.

By implementing such an enhancement, the wireless terminal that is registered with the network performs initial network access by reading the non-encrypted root MAP 1012 for non-authenticated wireless terminals and proceeds to the authentication stage. At the authentication stage the registered wireless terminal obtains a TEK for each service flow and a public message key for encryption of selective management messages. Following this, the registered wireless terminal having passed authentication and/or authorization procedures is capable of decrypting all encrypted DL or UL MAPs. A malicious wireless terminal that has not passed the authentication and/or authorization procedures, cannot decrypt the encrypted mapping component messages and therefore cannot determine appropriate UL resource allocation for sending an UL BW request code. Therefore, there is no chance for the malicious wireless terminal to send a BW request header and disrupt and/or slow down the network with pointless requests.

Figure 20:
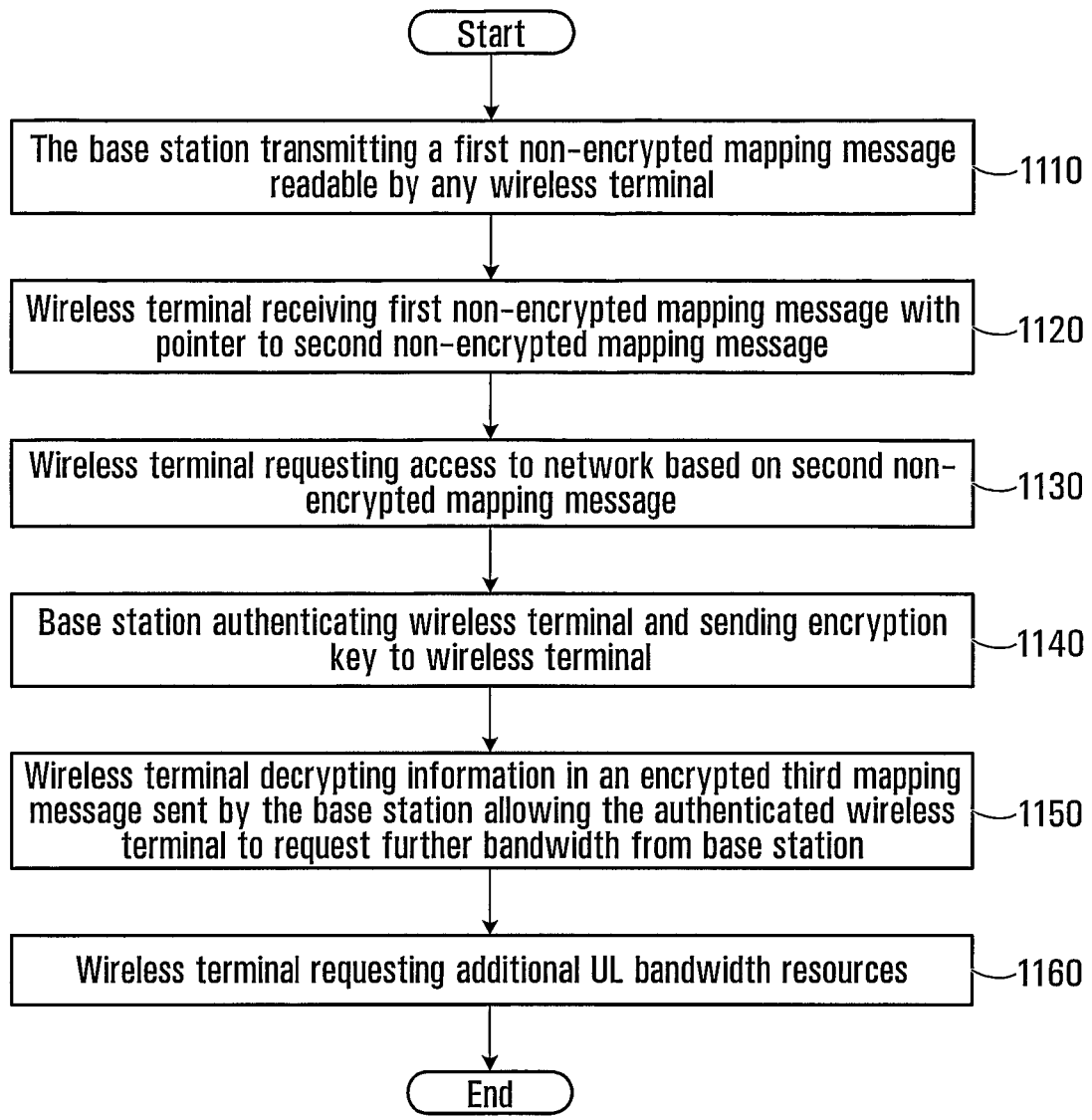
FIG. 20 is a flow chart for a method of resource management protection according to an embodiment of the invention.

In some embodiments of the invention, a method is provided, as shown in a flow chart of FIG. 20 for resource management of resources in a network. At step 1110, a data frame is transmitted by the base station providing a first non-encrypted mapping message readable by any wireless terminal, including a pointer to a second non-encrypted mapping message used for initial network access. This second non-encrypted mapping message is also readable by any wireless terminal. The first non-encrypted mapping message may also include a pointer to an encrypted mapping message used to identify a location in the data frame for requesting transmission resources, this encrypted mapping message being readable only by wireless terminals that are authenticated to be registered with the network.

At step 1120, the wireless terminal receives the first non-encrypted mapping message and uses the pointer to the second non-encrypted mapping message to locate the second non-encrypted mapping message. The second non-encrypted mapping message includes a pointer to a location in the up-link subframe of the data frame for the wireless terminal to request initial access to the network. When the wireless terminal has received the first non-encrypted mapping message and located the second non-encrypted mapping message, the wireless terminal requests access to the network at step 1130, for example by transmitting a request to the base station in a portion of the up-link subframe identified by the second non-encrypted mapping message. The base station authenticates that the wireless terminal is a registered wireless terminal with the network, grants the wireless terminal's request for access to the network, and sends the wireless terminal a public access encryption key at step 1140.

Using the received encryption key, the wireless terminal is then able to decrypt an encrypted mapping message sent by the base station at step 1150. The encrypted mapping message comprises a pointer to a slot in the up-link subframe of the data frame allocated by the base station to be used by the wireless terminal for requesting additional transmission resources from the base station. The wireless terminal uses the decrypted information to make a request for further up-link transmission resources at step 1160.

While the above resource management protection scheme is described as an example with respect to the wireless terminal requesting additional bandwidth resources (BW request), it is to be understood that other facets of communication between the base station and the wireless terminal may lend themselves to using such a resource management protection scheme and it is therefore within the scope of the invention that the described resource management protection scheme can be used wherever such a scheme is needed for transmissions between the base station and the wireless terminal.

Numerous modifications and variations of the present invention are possible in light of the above teachings. It is therefore to be understood that within the scope of the appended claims, the invention may be practised otherwise than as specifically described herein.

The invention claimed is:

1. A method in a base station for operating a hybrid automatic repeat request (H-ARQ) enabled OFDM (orthogonal frequency multiplexing) connection with a wireless terminal, the method comprising:
for each transmission resource allocation, the base station:
sending, for reception by the wireless terminal, information of where a H-ARQ transmission is located in a data frame;
sending an identification of the H-ARQ transmission, and
wherein the wireless terminal is a MIMO enabled wireless terminal and for enabling the H-ARQ transmission in an up-link (UL) direction from the wireless terminal to the base station, the method further comprising for each transmission resource allocation, the base station:
identifying the H-ARQ transmission as being performed by one of a collaborative spatial multiplexing transmission and a non-collaborative spatial multiplexing transmission using a collaborative spatial multiplexing indication; and
sending the collaborative spatial multiplexing indication.

2. The method of claim 1, wherein the H-ARQ enabled connection is an incremental redundancy (IR) based H-ARQ enabled connection.

3. The method of claim 2, further comprising:
if the H-ARQ transmission from the wireless terminal to the base station is not performed using collaborative spatial multiplexing, the base station sending an indication of when a new packet, which includes the H-ARQ transmission, is being transmitted and sending an identification of a sub-packet, which includes at least a portion of the H-ARQ transmission, that is being transmitted;
if the H-ARQ transmission from the wireless terminal to the base station is performed using collaborative spatial multiplexing, for each wireless terminal used in the collaborative spatial multiplexing, the base station sending an indication of when the new packet, which includes the H-ARQ transmission, is being transmitted and sending an identification of the sub-packet, which includes at least a portion of the H-ARQ transmission, that is being transmitted.

4. The method of claim 3, wherein if the transmission does not use collaborative spatial multiplexing the base station further sends an indication of whether space-time transmit diversity (STTD) or spatial multiplexing (SM) is used for transmitting the H-ARQ transmission.

5. The method of claim 2, wherein sending an identification of the H-ARQ transmission for a non-MIMO enabled wireless terminal comprises sending an indication of when a new packet, which includes the H-ARQ transmission, is being transmitted and sending an identification of a sub-packet, which includes at least a portion of the H-ARQ transmission, that is being transmitted.

6. The method of claim 1, wherein the H-ARQ enabled connection is a Chase based H-ARQ enabled connection.

7. The method of claim 4, further comprising:
if the H-ARQ transmission from the wireless terminal to the base station is not performed using collaborative spatial multiplexing, the base station sending an indication of a transmission count that indicates a current number of times the transmit information has been transmitted including the current transmission;
if the H-ARQ transmission from the wireless terminal to the base station is performed using collaborative spatial multiplexing, the base station sending an indication of a transmission count that indicates a number of times the transmit information has been transmitted including the current transmission for each wireless terminal used in the collaborative spatial multiplexing.

8. The method of claim 6, wherein sending an identification of the H-ARQ transmission for a non-MIMO enabled wireless terminal comprises sending an indication of a transmission count that indicates a number of times the transmit information has been transmitted including the current transmission.

9. The method of claim 1, wherein sending, for reception by the wireless terminal, location information comprises either sending both an indication of an initial starting point of a region for the transmission resource allocation in the data frame and an indication of the size of the region for the transmission resource allocation in the data frame, or sending an indication of a duration of a region for the transmission resource allocation in the data frame.

10. The method of claim 1, wherein the base station sending information to the wireless terminal comprises the base station sending the information in an information element (IE) of the data frame, the data frame transmitted from the base station to the wireless terminal.

11. The method of claim 10, wherein the base station sending the information in an IE comprises the base station sending the IE as a plurality of fields in the data frame, each field comprising one or more bits.

12. A method in a wireless terminal for operating a hybrid automatic repeat request (H-ARQ) enabled OFDM (orthogonal frequency multiplexing) connection with a base station, the method comprising:
for each transmission resource allocation, the wireless terminal:
receiving the wireless terminal location information of where a H-ARQ transmission is located in a data frame; and
receiving an identification of the H-ARQ transmission, wherein the wireless terminal is a MIMO enabled wireless terminal and for enabling the H-ARQ transmission in an up-link (UL) direction from the wireless terminal to the base station, the method further comprising for each transmission resource allocation, the wireless terminal:
receiving a collaborative spatial multiplexing indication; and
identifying the H-ARQ transmission as being performed by one of a collaborative spatial multiplexing transmission and a non-collaborative spatial multiplexing transmission using the collaborative spatial multiplexing indication.

13. The method of claim 12, wherein the H-ARQ enabled connection is an incremental redundancy (IR) based H-ARQ enabled connection.

14. The method of claim 13, further comprising:
if the H-ARQ transmission from the wireless terminal to the base station is not performed using collaborative spatial multiplexing, the wireless terminal receiving an indication of a transmission count that indicates a current number of times the transmit information has been transmitted including the current transmission;
if the H-ARQ transmission from the wireless terminal to the base station is performed using collaborative spatial multiplexing, the wireless terminal receiving an indication of a transmission count that indicates a number of times the transmit information has been transmitted including the current transmission for each wireless terminal used in the collaborative spatial multiplexing.

15. The method of claim 13, wherein receiving an identification of the H-ARQ transmission for a non-MIMO enabled wireless terminal comprises receiving an indication of when a new packet, which includes the H-ARQ transmission, is being transmitted and receiving an identification of a sub-packet, which includes at least a portion of the H-ARQ transmission, that is being transmitted.

16. The method of claim 12, wherein the H-ARQ enabled connection is a Chase based H-ARQ enabled connection.

17. The method of claim 16, wherein receiving an identification of the H-ARQ transmission for a non-MIMO enabled wireless terminal comprises receiving an indication of a transmission count that indicates a number of times the transmit information has been transmitted including the current transmission.

18. The method of claim 12, further comprising:
if the H-ARQ transmission from the wireless terminal to the base station is not performed using collaborative spatial multiplexing, the wireless terminal receiving an indication of a transmission count that indicates a current number of times the transmit information has been transmitted including the current transmission;
if the H-ARQ transmission from the wireless terminal to the base station is performed using collaborative spatial multiplexing, the wireless terminal receiving an indication of a transmission count that indicates a number of times the transmit information has been transmitted including the current transmission for each wireless terminal used in the collaborative spatial multiplexing.

19. The method of claim 12, wherein if the transmission does not use collaborative spatial multiplexing the wireless terminal further receives an indication of whether space-time transmit diversity (STTD) or spatial multiplexing (SM) is used for transmitting the H-ARQ transmission.

20. The method of claim 12, wherein receiving location information comprises either receiving both an indication of an initial starting point of a region for the transmission resource allocation in the data frame and an indication of the size of the region for the transmission resource allocation in the data frame, or receiving an indication of a duration of a region for the transmission resource allocation in the data frame.

21. A base station comprising:
at least two antennas;
a baseband processor; and
transmit and receive circuitry coupling the baseband processor to The at least two antennas;
for each transmission resource allocation, the base station configured to:
send, for reception by the wireless terminal, information of where a H-ARQ transmission is located in a data frame;
send an identification of the H-ARQ transmission, and wherein the wireless terminal is a MIMO enabled wireless terminal and for enabling the H-ARQ transmission in an up-link (UL) direction from the wireless terminal to the base station, the base station further configured to, for each transmission resource allocation, identify the H-ARQ transmission as being performed by one of a collaborative spatial multiplexing transmission and a non-collaborative spatial multiplexing transmission using a collaborative spatial multiplexing indication, and send the collaborative spatial multiplexing indication.

22. A wireless terminal comprising:
at least one antenna;
a baseband processor; and
transmit and receive circuitry coupling the baseband processor to the at least one antenna;
for each transmission allocation, the wireless terminal configured to:
receive the wireless terminal location information of where a H-ARQ transmission is located in a data frame;
receive an identification of the H-ARQ transmission, wherein the wireless terminal is a MIMO enabled wireless terminal and for enabling the H-ARQ transmission in an up-link (UL) direction from the wireless terminal to the base station, the wireless terminal configured to, for each transmission resource allocation, receive a collaborative spatial multiplexing indication, and identify the H-ARQ transmission as being performed by one of a collaborative spatial multiplexing transmission and a non-collaborative spatial multiplexing transmission using the collaborative spatial multiplexing indication.

* * * * *